(12) United States Patent
Sakai

(10) Patent No.: US 10,025,603 B2
(45) Date of Patent: Jul. 17, 2018

(54) PARALLEL PROCESSING DEVICE, PARALLEL PROCESSING METHOD, AND PARALLEL PROCESSING PROGRAM STORAGE MEDIUM

(71) Applicant: NEC Corporation, Minato-ku, Tokyo (JP)

(72) Inventor: Junji Sakai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 383 days.

(21) Appl. No.: 14/767,981

(22) PCT Filed: Feb. 24, 2014

(86) PCT No.: PCT/JP2014/000946
§ 371 (c)(1),
(2) Date: Aug. 14, 2015

(87) PCT Pub. No.: WO2014/132608
PCT Pub. Date: Sep. 4, 2014

(65) Prior Publication Data
US 2016/0004543 A1     Jan. 7, 2016

(30) Foreign Application Priority Data
Feb. 26, 2013   (JP) .................................. 2013-035789

(51) Int. Cl.
*G06F 3/00*      (2006.01)
*G06F 9/44*      (2018.01)
(Continued)

(52) U.S. Cl.
CPC .......... *G06F 9/4494* (2018.02); *G06F 9/4436* (2013.01); *G06F 9/5066* (2013.01); *G06F 9/54* (2013.01)

(58) Field of Classification Search
None
See application file for complete search history.

(56) References Cited

U.S. PATENT DOCUMENTS

2006/0253836 A1* 11/2006 Hiroshi ............... G06F 17/5045
                                                              717/114
2010/0125847 A1    5/2010 Hayashi

FOREIGN PATENT DOCUMENTS

JP       H06-332664 A     12/1994
JP       H08-044678 A     2/1996
(Continued)

OTHER PUBLICATIONS

Japanese Office Action for JP Application No. 2015-502758 dated Jun. 20, 2017 with English Translation.
(Continued)

*Primary Examiner* — Tuan Dao
*Assistant Examiner* — William C Wood

(57) ABSTRACT

Provided is a parallel processing device whereby a plurality of single processes is efficiently and simply parallel processed by a plurality of processors. The parallel processing device includes: a first processor which executes, upon data which is included in data sets, a first program which defines a single process which is executed with the data as an input thereof, and outputs a first result; and includes a second processor which executes, upon the inputted data, a second program which defines a unit process and outputs a second result. A selection unit selects, based on a prescribed index which denotes either performance or function of the first processor and the second processor, a first partial set and a second partial set from the data set. A first processor control unit inputs into the first processor first data which is included in the first partial set. A second processor control unit inputs into the second processor second data which is included in the second partial set. The first and second programs are executed in parallel by the first and second processors.

7 Claims, 19 Drawing Sheets

(51) Int. Cl.
*G06F 9/46* (2006.01)
*G06F 13/00* (2006.01)
*G06F 9/448* (2018.01)
*G06F 9/50* (2006.01)
*G06F 9/54* (2006.01)

(56) References Cited

FOREIGN PATENT DOCUMENTS

| | | |
|---|---|---|
| JP | 2001-126030 A | 5/2001 |
| JP | 2003-243988 A | 8/2003 |
| JP | 2006-262311 A | 9/2006 |
| JP | 2010-122758 A | 6/2010 |
| JP | 2010-134669 A | 6/2010 |
| JP | 2011-197803 A | 10/2011 |

OTHER PUBLICATIONS

International Search Report for PCT Application No. PCT/JP2014/000946, dated Mar. 25, 2014.
Ofer Rosenberg, "OpenCL Overview",[online], Nov. 2011, KHRONOS Group, [retrieved on Jan. 22, 2013], Internet <URL: http://haifux.org/lectures/267/OpenCL_Overview.pdf >, Cited in the Specification.
English Translation of Written Opinion for PCT Application No. PCT/JP2014/000946.

* cited by examiner

PARALLEL PROCESSING DEVICE, PARALLEL PROCESSING METHOD, AND PARALLEL PROCESSING PROGRAM STORAGE MEDIUM

TECHNICAL FIELD

The present application is a National Stage Entry of PCT/JP2014/000946 filed Feb. 24, 2014, which is based on and claims the benefit of the priority of Japanese Patent Application No. 2013-035789, filed on Feb. 26, 2013, the disclosures of all of which are incorporated herein in their entirety by reference.

BACKGROUND ART

There is an increasing demand for high-level recognition and matching processing, such as image recognition by a surveillance camera and biometric authentication using fingerprint or iris. The processing matches a large number of previously registered data to to-be-matched data given as input to find registered data closest (having a highest likelihood of matching) to the to-be-matched data. More advanced and larger-scale systems are expected to not only reduce time for processing one to-be-matched data but also improve throughput for processing a large number of to-be-matched data. From the viewpoint of responding to improvement in recognition algorithm and maintaining flexibility in system architecture, it seems favorable that such large-scale matching systems are achieved by software on general-purpose processors.

On the other hand, from the point of view of semiconductor devices, improvement of processor operation clock has recently being slowing down, and performance is increasingly being improved through parallel processing using plural or multiple processor cores. For example, some CPUs (Central Processing Unit) for general-purpose processing devices, such as personal computers and servers have a multicore configuration with about two to eight cores. In addition, regarding GPUs (Graphical Processing Units) for image processing and scientific computing, there are those that have a many-core configuration with several hundreds of simple cores.

The large-scale matching systems require not only matching processing but also versatile processing such as registration data management and input/output control. Accordingly, favorably, the large-scale matching systems are constructed by a combination of a general-purpose host processor and a matching-directed many-core coprocessor. This requires a parallel processing technique for performing high-level and large-scale matching processing by appropriate sharing between a host processor and a coprocessor.

The following is parallel processing techniques associated with matching and recognition.

Patent Literature 1 discloses a technique in which, in matching processing of a three-dimensional object, a data region is divided so that an amount of data to be processed per thread is equal and is below a predetermined amount, and data is input to a GPU to cause the GPU to perform parallel processing.

Patent Literature 2 discloses a technique in which, in pattern recognition processing, matching with dictionary data is performed in parallel by a plurality of processor cores in the same number as dictionary patterns.

Patent Literature 3 discloses an information recording device that compares video/audio contents by using units of chapter data forming the contents to detect predetermined chapter data. The information recording device of Patent Literature 3 is not particularly considered for application of any parallel processing technique.

Patent Literature 4 discloses a data processing device that performs pattern matching by calculation similarities of an input pattern and a template pattern. The data processing device of Patent Literature 4 is serially inputted input data bit by bit in calculating the similarities. The data processing device thereof does not perform calculation using the parallel processing technique.

Patent Literature 5 discloses a display control system that prefetches image data expected to be read-accessed in the future to store it into cache memory.

An OpenCL (Open Computing Language; registered trademark) technique described in Non Patent Literature 1 is a general-purpose technique for using a coprocessor (typically, a GPU) from a hots processor. Use of the OpenCL technique allows programming less dependent on a specific coprocessor product. Specifically, a user of the OpenCL technique determines, in addition to a central algorithm for processing an execution target (hereinafter referred to as "target processing"), a method for dividing the target processing into pieces of unit processing that can be performed in parallel (hereinafter referred to as "parallel division"). Then, the user issues an instruction of communication between the host processor and the coprocessor according to the determined method, based on a format of the OpenCL. The above-described operations by the user allows achievement of a parallel processing system using the coprocessor.

CITATION LIST

Patent Literature

PTL 1: Japanese Laid-open Patent Publication No. 2010-134669
PTL 2: Japanese Laid-open Patent Publication No. 2001-126030
PTL 3: Japanese Laid-open Patent Publication No. 2006-262311
PTL 4: Japanese Laid-open Patent Publication No. 2003-243988
PTL 5: Japanese Laid-open Patent Publication No. H6-332664

Non Patent Literature

NPL 1: Ofer Rosenberg, "OpenCL Overview",[online], November 2011, KHRONOS Group, [retrieved on Jan. 22, 2013], Internet <URL: http://www.khronos.org/assets/uploads/developers/library/overview/opencl-overview.pdf>

SUMMARY OF INVENTION

Technical Problem

The techniques of Patent Literature 1 and 2 allow a device for a specific purpose, such as matching or recognition, to achieve jobs from core processing to parallel control, as integrated processing. Accordingly, a device developer is expected not only to gain familiarity with a central algorithm of target processing in his or her field, but to have knowledge outside his or her field, i.e., that of a so-called "parallel programming". The "parallel programming" is to create a program that, for example, divides in parallel target processing into pieces of unit processing to provide to a GPU and each of a plurality of CPU cores and appropriately performs processing synchronization and exclusive control between the cores.

A plurality of CPU cores are incorporated in various forms in a processing device. For example, in a processing device including a plurality of processors such as host processor and coprocessor, there may be performed a parallel programming using CPU cores incorporated in each processor. Alternatively, in a processing device including processors each including two or more CPU cores, there may be performed a parallel programming using a plurality of CPU cores incorporated in each processor. Thus, there are various configurations in which a plurality of CPU cores used in parallel programming are incorporated in a processing device.

However, as will be described below, parallel programming has difficult problems for technical personnel other than experts.

A first problem is that it is difficult to make full use of a plurality of CPU cores in order to speed up target processing.

The techniques of Patent Literature 1 and 2 cause the system developer to assume responsibilities for the above parallel programming, namely, parallel division of multi-core-directed target processing, data transmission between host processor and coprocessor, and coprocessor control. However, the parallel programming is very complicated for a technical person who does not specialize in the field.

On the other hand, in the technique of Non Patent Literature 1, the responsibilities of the developer for data transmission and coprocessor control are reduced by using the OpenCL mechanism. Nevertheless, determination of a parallel division system suitable to coprocessor and achievement of parallel division are still jobs of the system developer.

A second problem is that it is difficult to make performance tuning in accordance with the coprocessor. In order to make fullest use of performance of a plurality of CPU cores, such as CPU cores incorporated in host processor or coprocessor, or CPU cores incorporated in host processor and coprocessor, control is newly needed to appropriately allocate entire target processing to each of the cores.

However, in general, depending on the system configuration, the architecture and numbers of host processors and coprocessors, and the number of cores incorporated in each processor often vary. Furthermore, processing performance of each core and a processing content suitable to each core are also sometimes various. Accordingly, allocation of processing load needs to be corrected according to the system-specific factors that affect processing performance, as mentioned above. The system developer has to bear a burden for such tuning work.

The techniques of Patent Literature 3, 4, and 5 do not concern parallel processing. Accordingly, there cannot be obtained a great advantage in which speeding up is achieved by parallel processing. Particularly, when target processing includes pieces of unit processing simultaneously executable, the effect of speeding up by parallel processing is tremendous. However, the techniques of Patent Literature 3, 4, and 5 do not offer the advantage. Even if parallel processing is applied to the techniques thereof, the above problem about parallel programming cannot be solved.

The problems described above are not limited to parallelization of matching processing and recognition processing. When target processing includes a plurality of pieces of unit processing executable in parallel (hereinafter referred to as "parallelizable processing"), use of parallel processing allows the target processing to be efficiently executed.

However, as described above, there are problems to be solved to effectively perform parallel processing.

For example, image processing, which performs a desired operation or provides a desired effect on an image by executing the same calculation on individual pixels forming an image, also includes processing parallelizable on pixel by pixel. Accordingly, even when parallelizing such image processing, improving processing speed requires adjustment for allocation of processing load on individual processors that execute unit processing, and the like. However, it is not desirable at all to expect a developer of image processing itself to deal with even load allocation, which is a concern of technically different perspective, since not only work load on the developer increases, but also it is processing outside the developer's field.

OBJECT OF THE PRESENT INVENTION

An object of the present invention is to provide a parallel processing device, a parallel processing method, and a parallel processing program storage medium that allow parallel processing of a plurality of pieces of unit processing to be easily programmed and efficiently performed in parallel by a plurality of processors.

Solution to Problem

A parallel processing device according to the present invention is characterized by including:

a first processor executing, on input data, a first program that prescribes unit processing to be executed by using data included in a data set as input to output a first result;

a second processor executing a second program that prescribes the unit processing on input data to output a second result;

a selection unit selecting a first subset and a second subset from the data set based on a predetermined index indicating performance or function of the first processor and the second processor;

a first processor control unit inputting first data included in the first subset to the first processor; and a second processor control unit inputting second data included in the second subset to the second processor, the first program and the second program being executed in parallel by the first processor and the second processor, respectively.

A parallel processing method according to the present invention is characterized by including: selecting a first subset and a second subset from a data set based on a predetermined index indicating performance or function of a first processor and a second processor included in a parallel processing device;

inputting first data included in the first subset into the first processor;

inputting second data included in the second subset into the second processor;

executing, on the first data, by using the first processor, a first program that prescribes unit processing to be executed by using, as input, data included in the data set to output a first result; and executing a second program that prescribes the unit processing on the second data by using the second processor in parallel with the first program to output a second result.

A non-transitory storage medium according to the present invention is characterized by storing a parallel processing program, the parallel processing program being for causing processors included in a parallel processing device comprising a first processor executing, on input data, a first program that prescribes unit processing to be executed by using, as input, data included in a data set to output a first result and a second processor executing a second program that prescribes the unit processing on input data to output a second result to function as:

a selection unit selecting a first subset and a second subset from the data set based on a predetermined index indicating performance or function of the first processor and the second processor; and a first processor control unit inputting first data included in the first subset into the first processor; or a second processor control unit inputting second data included in the second subset into the second processor, the first program and the second program being executed in parallel by the first processor and the second processor.

Advantageous Effects of Invention

According to the parallel processing device, the parallel processing method, and the parallel processing control program storage medium of the present invention, a plurality of pieces of unit processing can be easily programmed and efficiently performed in parallel by the plurality of processors.

DESCRIPTION OF EMBODIMENTS

Next, exemplary embodiments of the present invention will be described in detail with reference to the drawings.
(First Exemplary Embodiment)
[Structure of First Exemplary Embodiment]

Figure 1:
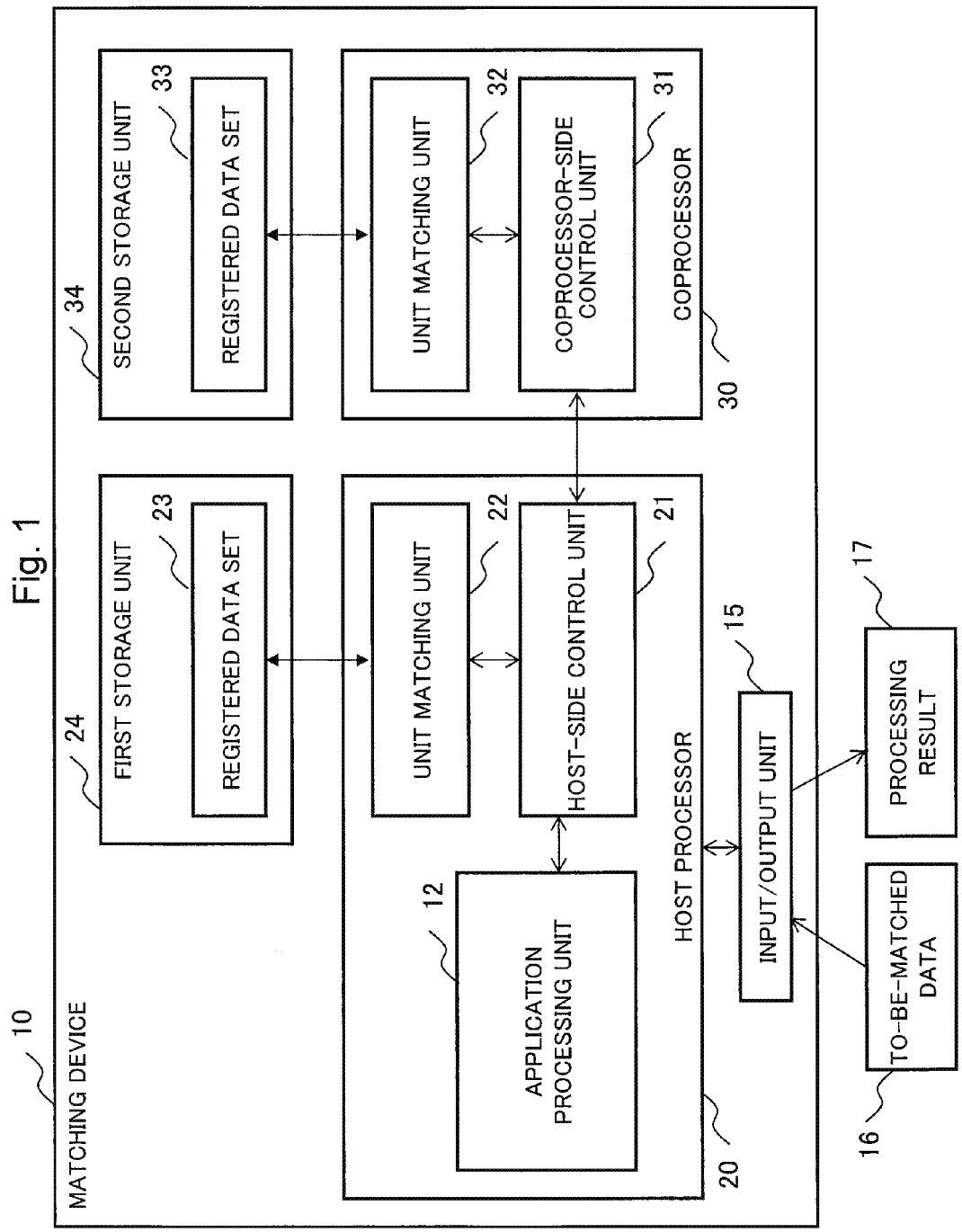
FIG. 1 is a block diagram showing an entire structure of a matching device according to a first exemplary embodiment of the present invention.

FIG. 1 is a block diagram showing an entire structure of a matching device 10 according to a first exemplary embodiment of the present invention.

The matching device 10 includes a host processor 20, a coprocessor 30, storage unit 24, 34, and an input/output unit 15.

The host processor 20 executes a predetermined program, whereby a host-side control unit 21, a unit matching unit 22, and an application program (hereinafter abbreviated as "application") processing unit 12 are achieved.

The coprocessor 30 executes a predetermined program, whereby a coprocessor-side control unit 31 and a unit matching unit 32 are achieved.

The storage unit 24, 34, respectively, stores registered data set 23, 33, respectively. The matching device 10 may not include the storage unit 24, 34 and may read in necessary data from the registered data set 23, 33 registered in an external predetermined storage unit when executing matching processing.

The matching device 10 reads in to-be-matched data 16 from outside to perform matching processing and output a processing result 17. A content of the matching processing will be described later.

Figure 2:
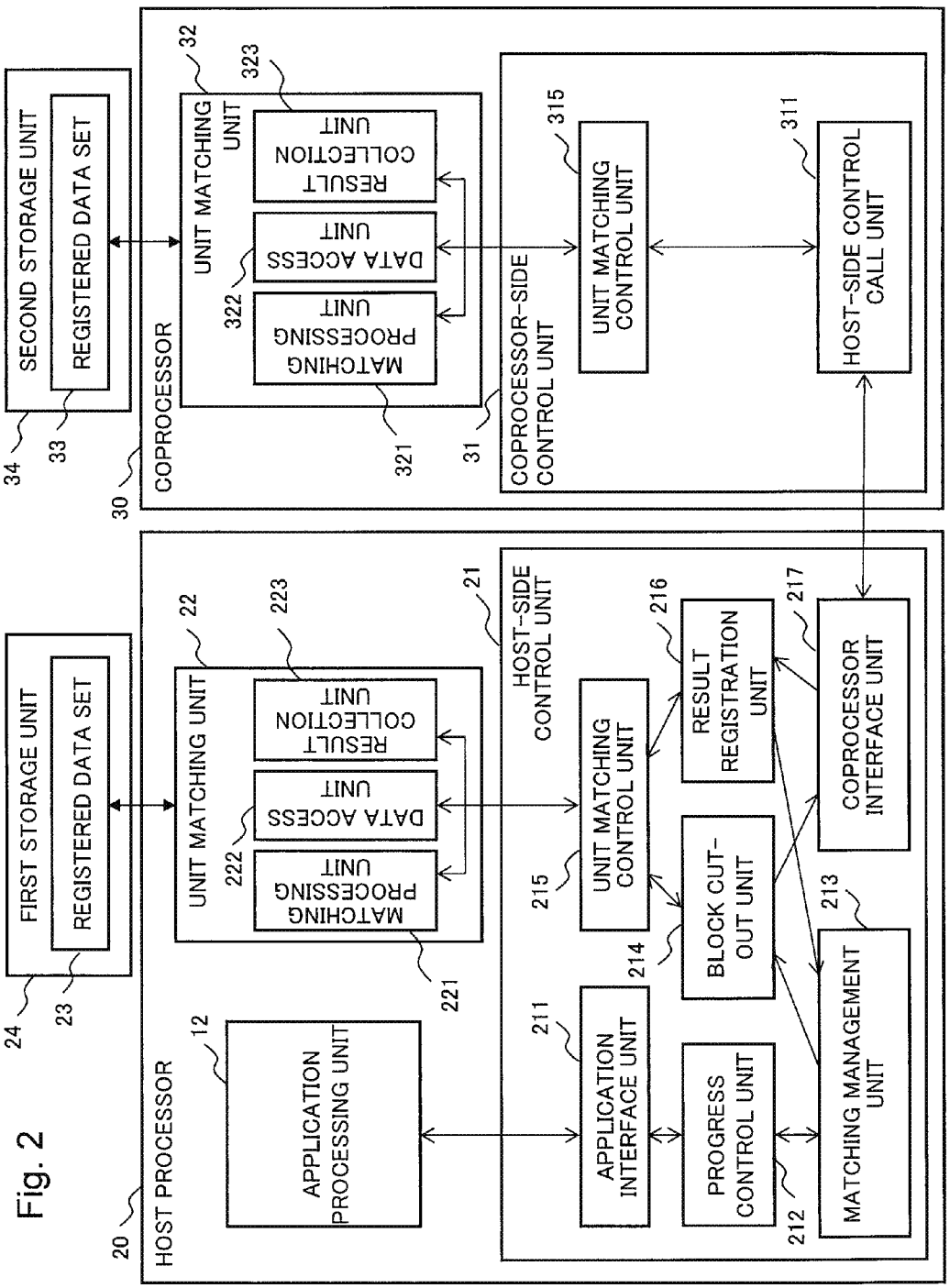
FIG. 2 is a block diagram showing inner structures of a host-side control unit, a coprocessor-side control unit, and a unit matching unit of the first exemplary embodiment of the present invention.

FIG. 2 is a block diagram showing inner structures of the host-side control unit 21, the coprocessor-side control unit 31, and the unit matching unit 22, 32. The host-side control unit 21 includes an application interface unit 211, a progress control unit 212, a matching management unit 213, a block cut-out unit 214, a unit matching control unit 215, a result registration unit 216, and a coprocessor interface unit 217.

The application interface unit 211 transmits and receives data to and from the application processing unit 12. The progress control unit 212 controls an entire operation of matching processing. The matching management unit 213 manages a progress status of the entire matching processing. The block cut-out unit 214 cuts out (extracts) a partial data from a whole part of data to be subjected to matching processing. The unit matching control unit 215 performs execution control when executing matching processing (hereinafter referred to as "unit matching processing") on data of the cut-out a part using the unit matching unit 22 in the host processor. The result registration unit 216 registers a result of unit matching processing in a progress management table. The coprocessor interface unit 217 communicates with the coprocessor-side control unit 31.

The coprocessor-side control unit 31 includes a host-side control call unit 311 and a unit matching control unit 315.

The host-side control call unit 311 communicates with the host-side control unit 21. The unit matching control unit 315 performs execution control when executing matching processing (unit matching processing) on a cut-out partial data by using the unit matching unit 32 in the coprocessor.

Functions of the unit matching control unit 315 and the unit matching unit 32, respectively, located on the coprocessor side are the same as functions of the unit matching control unit 215 and the unit matching unit 22 located on the host processor side.

The unit matching unit 32 on the host processor side includes a matching processing unit 221, a data access unit 222, and a result collection unit 223. The unit matching unit 32 on the coprocessor side includes a matching processing unit 321, a data access unit 322, and a result collection unit 323.

The matching processing unit 221, 321 executes unit matching processing on a pair of data elements. The data access unit 222, 322 obtains a location of a registered data element having a designated number. The result collection unit 223, 323 obtains one collection result giving a best "matching score" from a plurality of unit matching processing results. The "matching score" is a value indicating a degree of matching of a pair of data elements that are a processing target of unit matching processing.

An interface specification when each of the matching processing unit 221, the data access unit 222, and the result collection unit 223 on the host processor side operates in cooperation with the unit matching control unit 215 is the same as an interface specification when each of the matching processing unit 321, the data access unit 322, and the result collection unit 323 on the coprocessor side operates in cooperation with the unit matching control unit 315.

Figure 3:
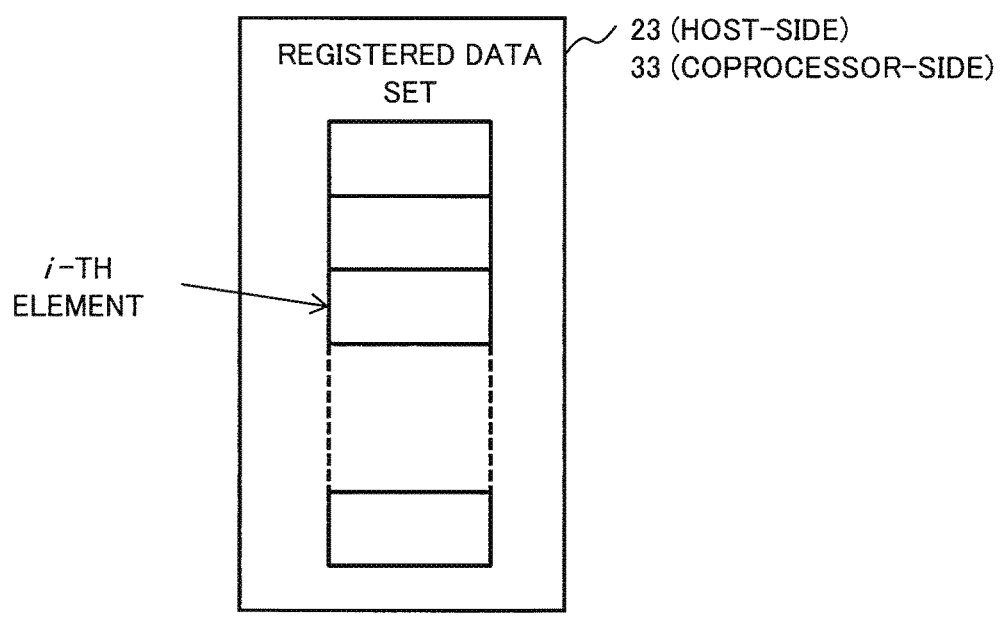
FIG. 3 is a diagram showing a structure of a registered data set.

FIG. 3 shows a structure of the registered data sets 23, 33.

The registered data set 23, 33 holds element data in an indexable manner, that is, in such a manner as to allow direct access to i (i represents a natural number not more than a number of pieces of element data included in data set)-th element data. Each element data of the registered data set 23, 33 has a data structure in which the element data is matched, at one to one, with to-be-matched data input to the matching device 10.

Typically, each element data of the registered data set 23, 33 is a structural body that has the same data structure as that of to-be-matched data and includes a characteristic vector used for matching. In addition, typically, the registered data set 23, 33 is achieved as arrays with an element of the above data structure.

Contents of the registered data sets 23, 33 stored in the storage unit 24 on the host processor side and the storage unit 34 on the coprocessor side, respectively, are the same. The registered data set 23, 33 is created before matching processing and not rewritable during system operation after that. Accordingly, it is unnecessary to perform consistency maintaining control and exclusive control on the registered data sets 23, 33 respectively arranged the storage unit 24 on the host processor side and the storage unit 34 on the coprocessor side, and the registered data sets 23, 33 are referred to as read-only.

Figure 4:
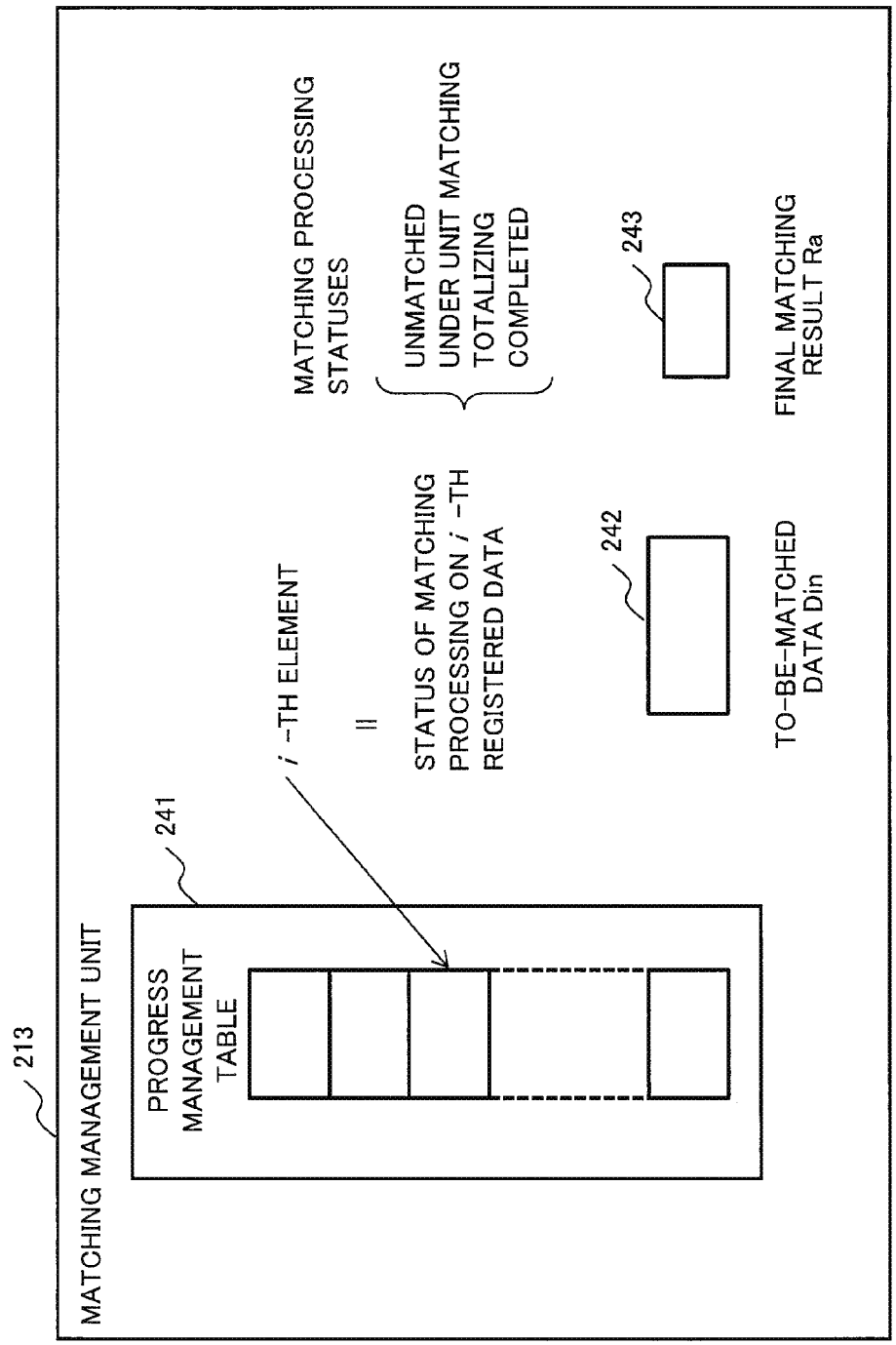
FIG. 4 is a diagram showing information of a managed object of a matching management unit of the first exemplary embodiment of the present invention.

FIG. 4 depicts information of a managed target of the matching management unit 213. The matching management unit 213 manages a progress management table 241, a to-be-matched data storage region 242, and a final matching result region 243. The progress management table 241, the to-be-matched data storage region 242, and the final matching result region 243 are, for example, secured in the first storage unit 24.

The progress management table 241 is a set data structure that holds element data in an indexable manner. Each element data of the progress management table 241 holds a processing status value that represents a matching processing status of a corresponding element in the registered data set 23. The matching processing status is categorized into four statuses: "unmatched", "under unit matching", "totalizing", and "completed", and a processing status value corresponding to each of the statuses is set. Index values of the progress management table 241 are set to the same values as indexes of the registered data sets 23, 33.

Typically, each element data of the progress management table 241 represent processing status values of integers expressing the above four statuses, and the progress management table 241 is entirely achieved as an array of the above element data (whose array length is the same as that in the registered data sets 23, 33).

The to-be-matched data storage region 242 is a region that holds a copy of to-be-matched data 16 given as an input.

The final matching result region 243 is a region that holds a result of unit matching processing previously done in a process of progress of matching processing. In other words, the final matching result region 243 is a region for storing a final matching result upon completion of matching processing. The final matching result region 243 stores two values: an index number of the registered data element 23, 33 that has brought a best unit matching result and a result value of the unit matching processing at that time.

[Operation Of First Exemplary Embodiment]

Operation of the present embodiment will be described by dividing it into preparation in advance and a matching processing main body.

(1) Preparation in Advance

Parameters to be set before starting matching processing will be described.

1) Maximum Cut-Out Size Nch

Nch represents maximum number of pieces of to-be-matched data at one time by the host processor 20 or the coprocessor 30. As the value of the Nch is larger, overhead by parallel processing becomes smaller. Conversely, as the value of the Nch is smaller, load upon parallel processing is balanced, thereby reducing waste of processor resources.

Accordingly, the value of the Nch is determined based on performance of the host processor 20 and the coprocessor 30, the number of pieces of element data of the registered data sets 23, 33, and an amount of calculation in one-time matching processing.

One rough standard of the value of the Nch is a value of one tenth of a value obtained by dividing the number of pieces of element data of the registered data sets 23, 33 by a total number of processors in the matching device 10, that is, a total of a number of host processors 20 and a number of coprocessors 30. The above-mentioned total number of processors mean not the number of processor cores incorporated in the host processors and the coprocessors but a total number of processors obtained when counting independent host processors and coprocessors, individually one by one. Accordingly, in the matching device 10, the total number of the processors is "2".

2) Number Th of Host Processor Threads

Th represents a number of threads of the host processor 20 usable for execution of the host-side unit matching unit 22. The value of the Th is typically set to a value equal to a number of processor cores included in the host processor 20.

When any function or any application other than the matching device 10 is simultaneously executed on the host processor 20, the value of the Th may be set to be smaller than the number of the processor cores included in the host processor 20.

3) Number Tc of Coprocessor Threads

Tc represents a value of threads of the coprocessor 30 available for execution of the coprocessor-side unit matching unit 32. A typical value of the Tc is set in the same manner as the number Th of the threads of the host processor 20 described above. Specifically, the value of the Tc is set to a value equal to a number of processor cores included in the coprocessor 30. When any function or any application other than the matching device 10 is simultaneously executed on the coprocessor 30, the value of the Tc may be set to be smaller than the number of the processor cores included in the coprocessor 30.

(2) Matching Processing Main Body

Figure 9:
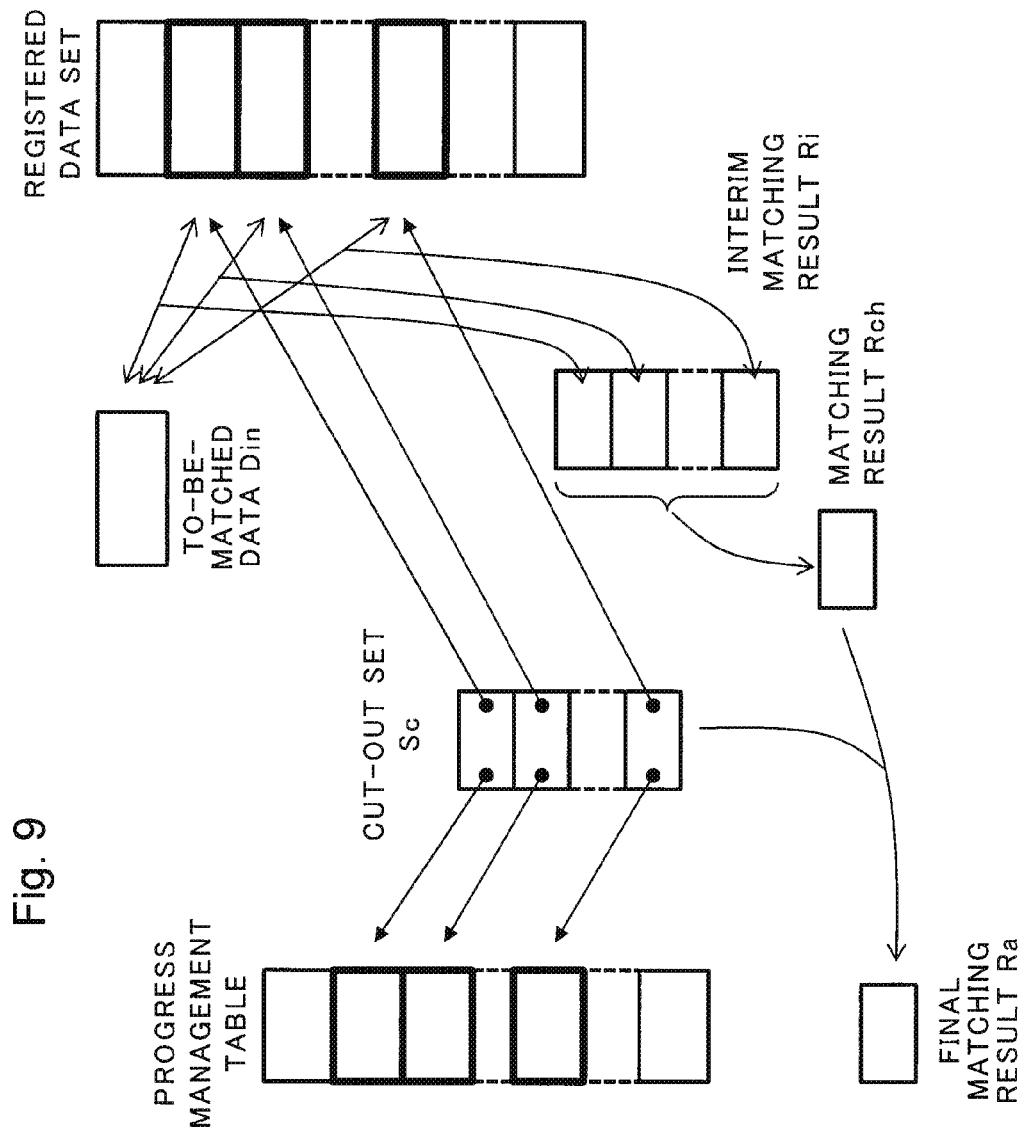
FIG. 9 is a diagram showing a correlation between respective data used in matching processing.

Next, a description will be given of operation of the main body part of the matching processing of the present embodiment. The description of the operation will use the various data structures, that is, the registered data sets 23, 33, the progress management table 241, the to-be-matched data storage region 242, a cut-out set Sc (which will be described later), an interim matching result Ri (which will be described later), a cut-out matching result Rch (which will be described later), and the final matching result region 243. For easier understanding of the present embodiment, FIG. 9 shows a correlation between these data structures.

Matching processing is started by reception of the to-be-matched data 16 from outside the matching device 10 via the input/output unit 15 by the application processing unit 12 and a request from the unit 12 to the application interface unit 211 in the host-side control unit 21 to perform matching processing of the to-be-matched data. This request is notified from the application interface unit 211 to the progress control unit 212. First, operation of the progress control unit 212 will be described.

a) Operation of Progress Control Unit 212

The progress control unit 212 copies the given to-be-matched data into the to-be-matched data storage region 242 in the matching management unit and sets a processing status value indicating the "unmatched" status to all pieces of element data of the progress management table 241.

In addition, the progress control unit 212 initializes the final matching result region 243 at an appropriate value in order to make a comparison between two matching results. Specifically, the progress control unit 212 sets an invalid index value (for example, −1) as an index, and a worst value (for example, "−2147483648" (minimum 32-bit signed integer)) as a matching result value. Hereafter, the progress control unit 212 performs a comparison between the two: the matching result or the initial value stored in the final matching result region 243 and a newly obtained matching result. Then, the progress control unit 212 stores the matching result that has a larger matching score as the final matching result at the point in time in the final matching result region 243.

Subsequently, the progress control unit 212 starts the unit matching control unit 215 on the host processor side and the unit matching control unit 315 on the coprocessor side. Next, operation of the unit matching control unit 215, 315 will be described.

b) Operation of Unit Matching Control Unit

Figure 5:
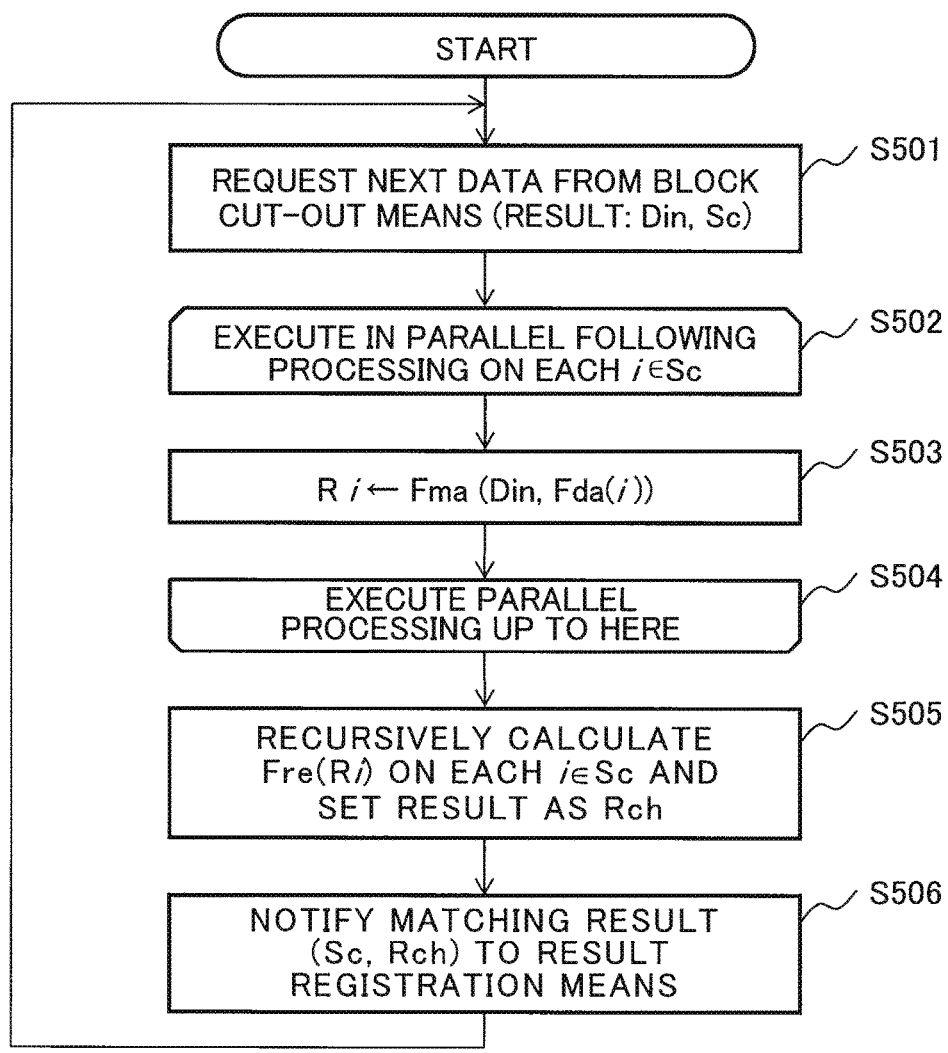
FIG. 5 is a flowchart of operation of the unit matching control unit of the first exemplary embodiment of the present invention.

FIG. 5 shows a flow of operation of the unit matching control unit 215, 315. The unit matching control unit 215 repeats a series of processing (steps S501 to S506) for calling the block cut-out unit 214, the unit matching unit 22 or the unit matching unit 32, and the result registration unit 216.

The unit matching control unit 215 on the host processor 20 side directly calls the block cut-out unit 214 and the result registration unit 216 located on the host processor 20 side.

On the other hand, the unit matching control unit 315 on the coprocessor 30 side indirectly calls the block cut-out unit 214 and the result registration unit 216 on the host processor 20 side via the host-side control call unit 311 and the coprocessor interface unit 217.

The unit matching unit 22, 32 that each corresponds to the processor causing the unit matching control unit 215, 315 to function is called at all times. Specifically, the unit matching control unit 215 on the host processor 20 side calls the unit matching unit 22 on the host processor, and the unit matching control unit 315 on the coprocessor side calls the unit matching unit 32 on the coprocessor, respectively.

The unit matching control unit 215 on the host processor 20 side is only different from the unit matching control unit 315 on the coprocessor 30 side in that the block cut-out unit 214 and the result registration unit 216 is directly or indirectly called. Flows of operation of the unit matching control unit 215 and the unit matching control unit 315 are the same. Thus, the same flow of operation thereof will be sequentially described with reference to a flowchart of operation of the unit matching control unit in FIG. 5.

1) Step S501

First, the unit matching control unit 215 requests the block cut-out unit 214 for a data block to be next processed.

Figure 6:
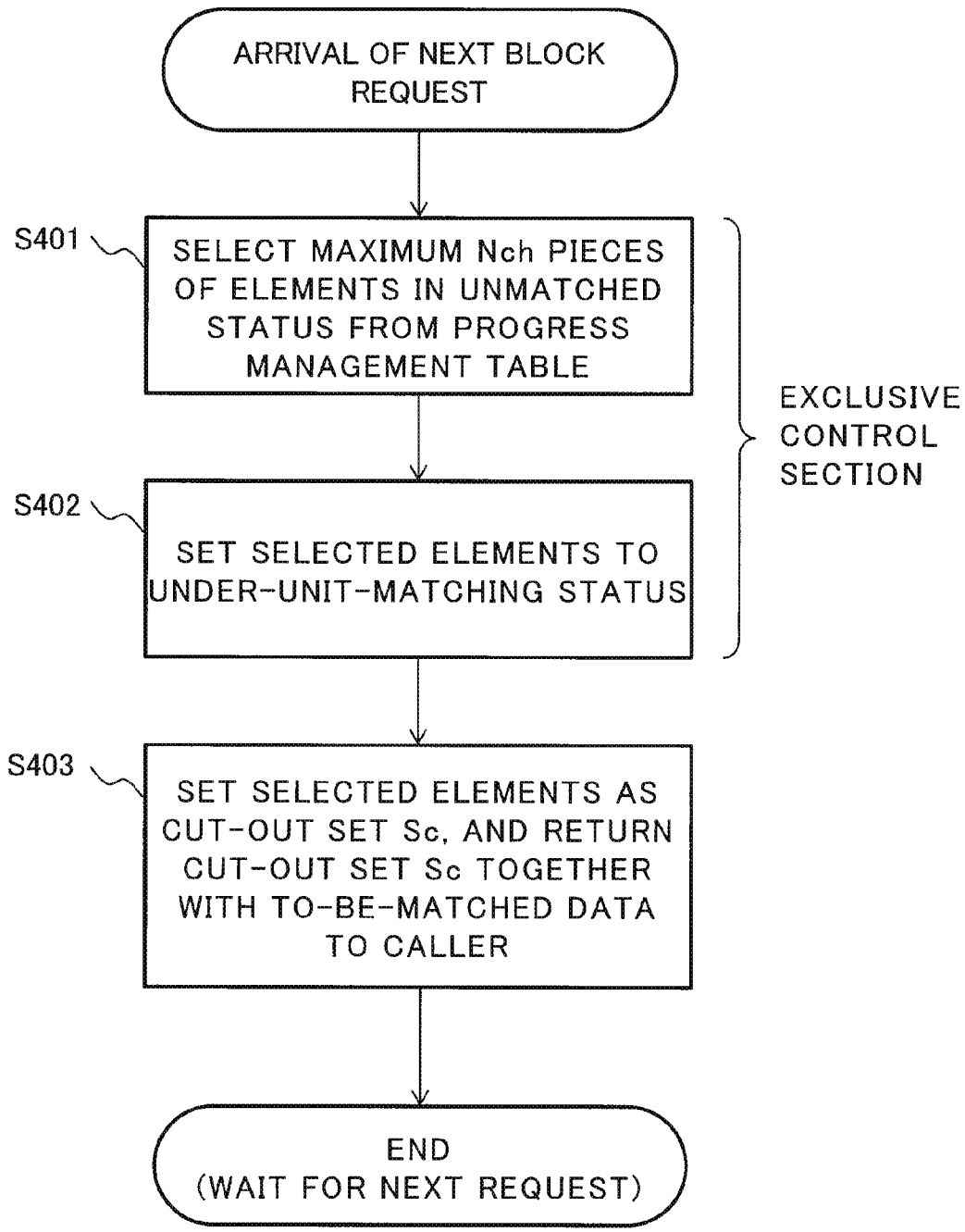
FIG. 6 is a flowchart of operation of a block cut-out unit of the first exemplary embodiment of the present invention.

FIG. 6 shows a flow of operation of the block cut-unit 214 that has received the request. The block cut-out unit 214 repeats an operation of performing a series of operations (S401 to S403) shown in FIG. 6 and waiting for a next call, every time it is called from the unit matching control unit 215, 315. The operation of the S401 to S403 by the block cut-out unit 214 is as follows:

1-1) Step S401

The block cut-out unit 214 scans each element of the progress management table 241 and finds maximum Nch pieces of element data whose procedure status value indicates the "unmatched status". If the number of pieces of the element data in the "unmatched status" found is merely less than the number of Nch pieces, the block cut-out unit 214 selects all of them.

1-2) Step S402

The block cut-out unit 214 sets a processing status value indicating "under unit matching" to the maximum Nch pieces of the element data found at step S401. The pieces of processing at steps S401 and S402 are executed under exclusive control, since the block cut-out unit 241 needs to properly operate even when it is simultaneously called from the plurality of unit matching control unit, that is, the unit matching control unit 22, 23. A mechanism of the exclusive control used here can be any mechanism as long as it properly operates on the host processor 20, and the mechanism thereof usable can be, for example, mutex.

1-3) Step S403

Figure 8:
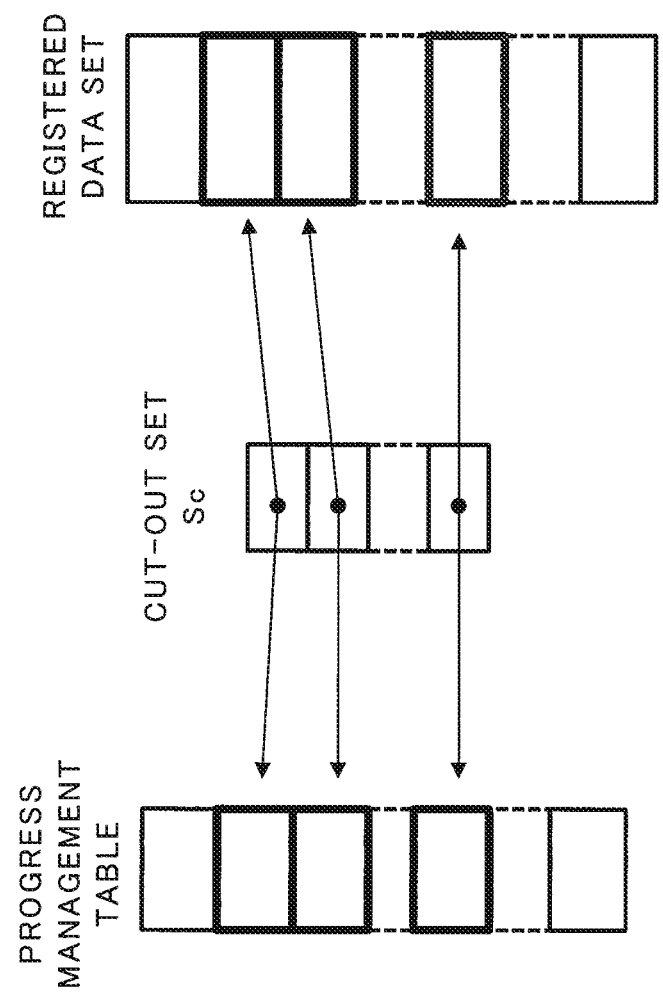
FIG. 8 is a diagram showing an element data structure of a cut-out set.

Next, the block cut-out unit 214 creates the cut-out set Sc. The cut-out set is a data structure that expresses a subset of the registered data set 23, 33, and, here, is a set that includes the previously selected maximum Nch pieces of element data. FIG. 8 is a diagram showing a structure of the element data of the cut-out set. The cut-out set is achieved as a set data structure holding the element data in an indexable manner, as shown in FIG. 8. Values of elements of the cut-out set are the index values of the progress management table 241 and the registered data set 23, 33. The block cut-out unit 214 adds data Din stored in the to-be-matched data storage region 242 located in the progress management table 241 to the cut-out set Sc created here to return the cut-out result to the unit matching control unit 215 or 315 as the caller.

2) Steps S502 to S504

The unit matching control unit 215, 315 obtains next data block information, that is, the to-be-matched data Din and the cut-out set Sc from the block cut-out unit. Then, the unit matching control unit 215, 315 executes in parallel one-to-one matching processing (N times of matching processing in total) of an i-th element of the registered data set and the to-be-matched data Din on each index value i included in the cut-out set Sc (a number of the elements included in the set is assumed to be N).

The above "one-to-one matching processing" will be executed as follows. First, the data access unit 222, 322 of the unit matching unit is called to obtain a location Fda(i) of the i-th element of the registered data set 23, 33. Next, a location of the to-be-matched data Din and the location of the i-th data element are transmitted to the matching processing unit 221, 321 to perform matching processing Fma between the to-be-matched data Din and the i-th data element, as a result of which an interim matching result Ri is obtained. The processing up to here is the one-to-one matching processing.

The unit matching control unit 215, 315 divides, in a non-overlapping manner, the N elements included in the cut-out set Sc into the number of threads (Th or Tc) usable by the processor (the host processor 20 or the coprocessor 30) in which the unit matching control unit operates. Then, the unit matching control unit 215, 315 causes each of the threads to share and execute N/Th, N/Tc times of matching processing, respectively.

For example, in a case of the threads of the host processor 20, a j-th thread (0≤j≤Th−1) of the host processor 20 performs one-to-one matching processing between registered data element and to-be-matched data Din corresponding to "N/Th" pieces of elements from an "N/Th*j"th to an "N/Th*(j+1)−1"th one. In this case, if "N/Th" or "N/Tc" is not divisible by any integer, some of the threads will have an assigned number of elements greater by one than the others.

3) Step S505

As a result of the parallel matching processing of steps S502 to S504, when N pieces of interim matching results Ri (i∈Sc) are obtained, the unit matching control unit 215, 315 recursively calls the result collection unit 223, 323 for the N pieces of interim matching results Ri. Then, the unit matching control unit 215, 315 obtains only one cut-out matching result Rch with respect to the N pieces of matching. As used herein, "recursive call of the result collection unit" means a process for repeating the operation of calling the result collection unit 223, 323 to obtain a matching result and finally obtaining the one cut-out matching result Rch from the N pieces of interim matching results Ri. In other words, the unit matching control unit 215, 315 first divides the N pieces of matching results Ri into pairs and calls, for each pair, the result collection unit 223, 323 (hereinafter, the calling processing of the result unit 223, 323 will be described as "Fre") to obtain N/2 pieces of matching results. Then, the unit matching control unit 215, 315 further divides the N/2 pieces of matching results into pairs and calls the result collection unit 223, 323 to obtain N/4 pieces of matching results.

4) Step S506

Lastly, the unit matching control unit notifies the cut-out set Sc and the cut-out matching result Rch to the result registration unit 216 (the notification will be described later), and then goes into a "stand-by status" for waiting for an instruction for starting next matching processing from the progress control unit 212.

b) Operation of Result Registration Unit

Figure 7:
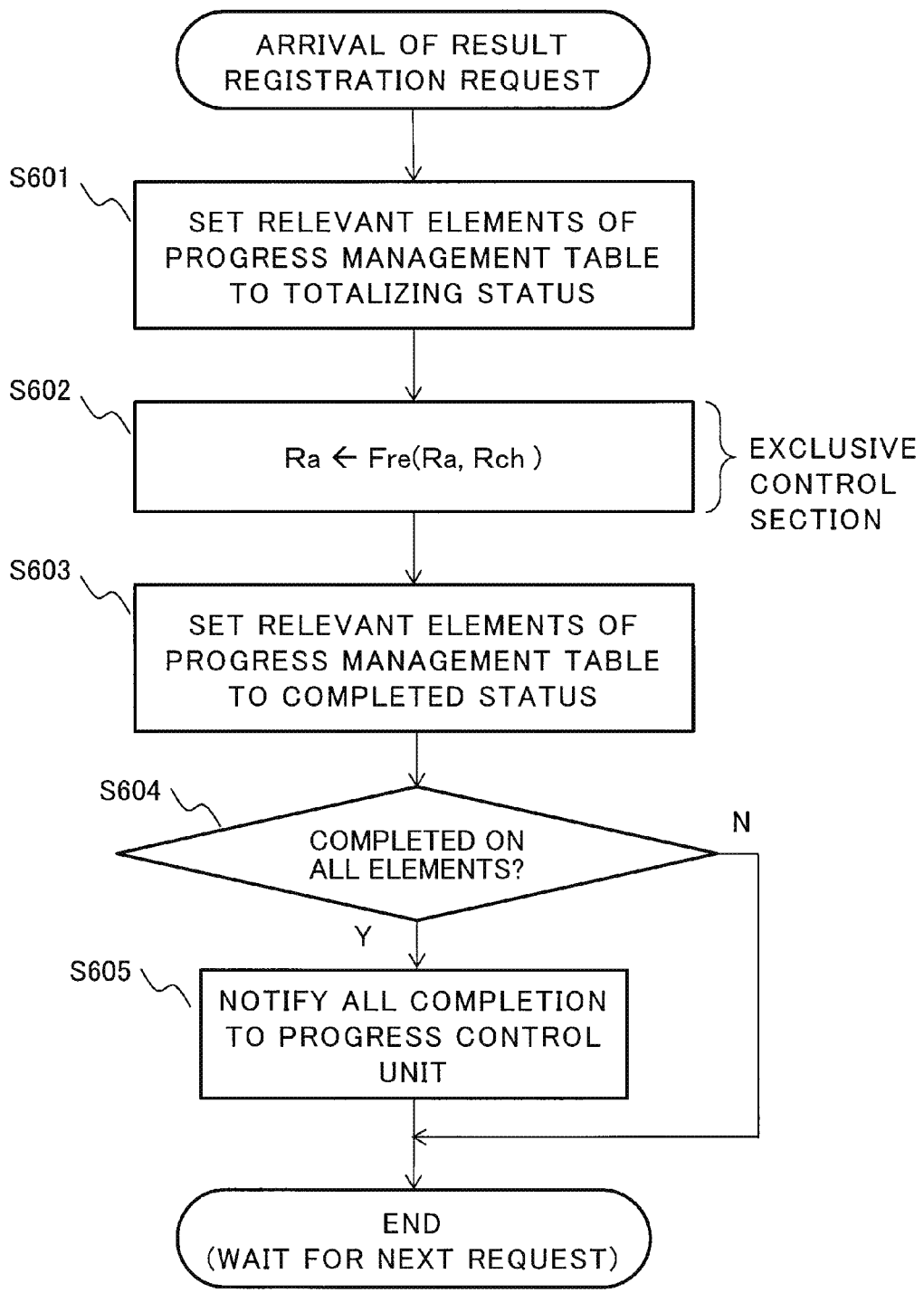
FIG. 7 is a flowchart of operation of a result registration unit of the first exemplary embodiment of the present invention.

FIG. 7 shows a flow of operation of the result registration unit 216 that has received the notification at step S506. The result registration unit 216 repeats an operation of performing a series of operations (S601 to S605) shown in FIG. 7 and waiting for a next call, every time it is called from the unit matching control unit 215, 315.

1) Step S601

The result registration unit 216, first, sets a processing status value indicating "totalizing status" to each element data in the progress management table 241 in which indexes of the element data are the values of the elements in the notified cut-out set Sc.

2) Step S602

Next, the result registration unit 216 calls the result collection unit 223, 323 (Fre) by using a value Ra of the final matching result region 243 and the cut-out matching result Rch notified from the unit matching control unit 215, 315. Then, the result registration unit 216 newly sets a value returned from the result collection unit 223, 323 as a final matching result Ra into the final matching result region 243.

The a series of processing (S602) for updating the Ra value is executed in an exclusive control section using an appropriate exclusive control mechanism on the host processor in preparation for when simultaneously called from the plurality of unit matching control unit.

3) Step S603

Next, the result registration unit sets a procedure status value indicating the "completed status" to each element data in the progress management table 241 that has been set to the "totalizing status" at step S601. As a result, when all pieces of element data in the progress management table go into the "completed status", the result registration unit notifies the completion of all matching processing to the progress control unit 212.

The progress control unit 212 having received the notification of the completion of all matching processing returns the content stored in the final matching result region 243 to the application 12 as the caller via the application interface unit 211. The application 12 outputs the matching processing result 17 via the input/output unit 15.

In this way, the matching of the to-be-matched data 16 given as the input and the registered data set 22,23 are executed in parallel using the host processor 20 and the coprocessor 30.

The description hereinabove has described the operations of the present embodiment. Now, a description will be given of work in developing a matching processing system using the present embodiment.

Figure 10:
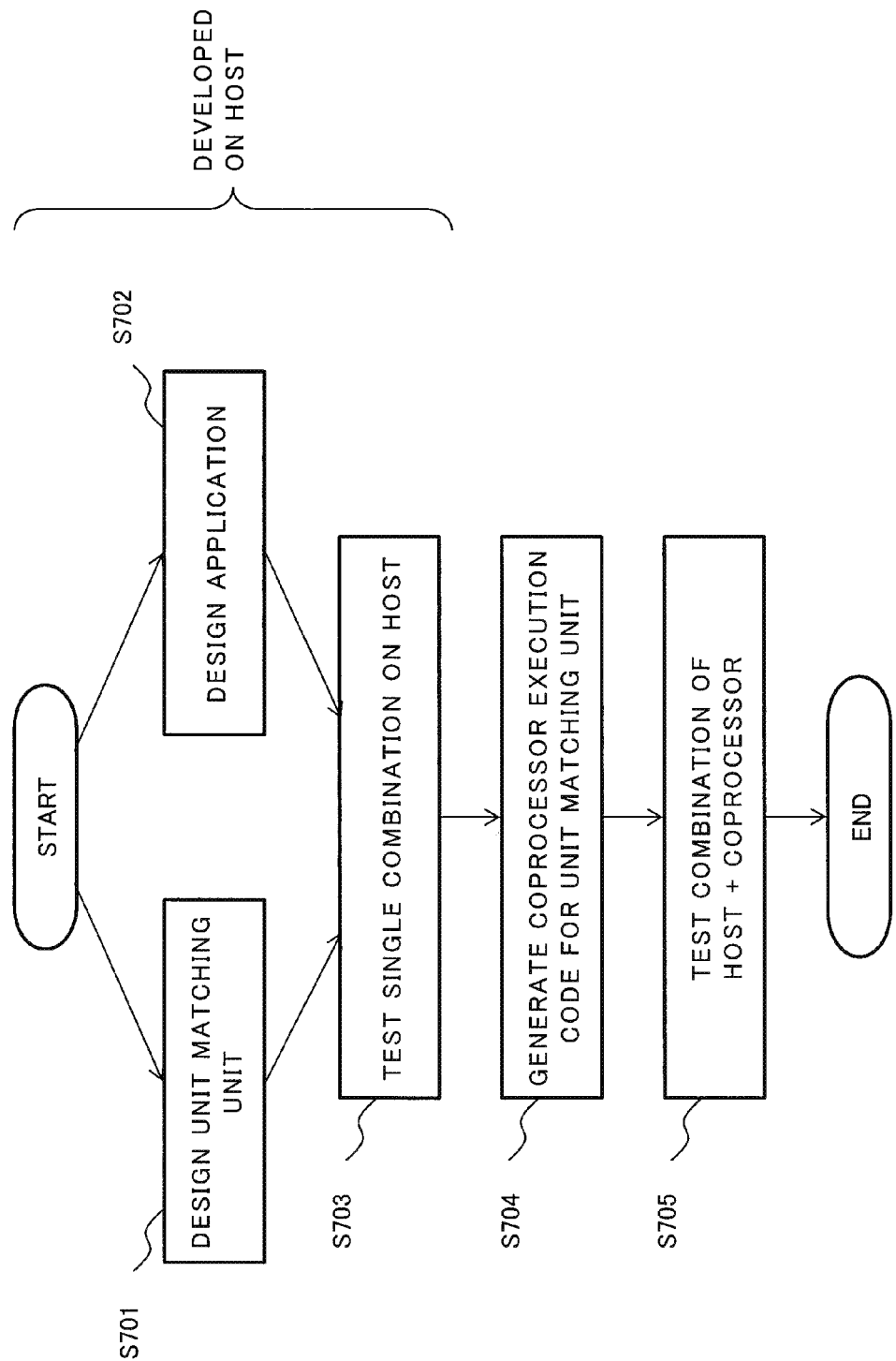
FIG. 10 is a diagram showing a flow of development work when developing a matching processing system using the matching device of the first exemplary embodiment.

FIG. 10 is a diagram showing a flow of development work in developing a matching processing system using the matching device of the first exemplary embodiment. As shown in FIG. 10, a system designer designs two parts: a unit matching unit incorporating an appropriate matching processing algorithm and an application processing unit for calling a host-side control unit, as non-parallelized, successive programs (S701, S702). Then, the system designer combines the unit unit and the application processing unit on the host side and performs an operation check (S703). All that the system designer needs to do is merely to perform the above design, manufacturing, and operation check.

After that, the system designer generates a coprocessor execution code for allowing the coprocessor to achieve the unit matching unit (S704). Then, the system designer combines the coprocessor execution code with the coprocessor-side control unit (S705).

When the above all work is completed, the host-side control unit 21 and the coprocessor-side control unit 31 allows the application to automatically use the unit matching unit on the host side and the coprocessor side. In brief, in order to perform matching processing using the matching device 10, all that the system designer needs to do is merely to prepare a unit matching processing program for performing a pair of matching (the unit matching processing unit 22) and generate a code for the host processor 20 and a code for the coprocessor 30.

On the other hand, in the matching device 10, the progress control unit 212, the matching management unit 213, and the unit matching control unit 215, 315 cooperate to divide matching processing in parallel. Specifically, the unit matching control unit 215, 315 divides matching processing into pieces of unit matching processing for each to-be-matched data so that the host processor 20 and the coprocessor 30 can execute matching processing in parallel. Then, the progress control unit 212 calls, on each processor, the unit matching processing codes prepared for the host processor 20 and the coprocessor 30 by the system developer. Accordingly, the matching processing as a whole is performed in parallel on all cores of the host processor 20 and the coprocessor 30. At this time, the system designer does not need to issue an instruction for complicated parallel processing.

Thus, the measure for achieving parallel processing, that is, the processing that allows the application to automatically use both the unit matching unit 22 on the host side and the unit matching unit 32 on the coprocessor side is performed not by the system designer but performed automatically by the host control unit 21 and the coprocessor control unit 31. In other words, the use of the matching device 10 of the present embodiment allows a system developer to easily construct a high performance matching system using all the cores of the host processor and the coprocessor.

In addition, the present embodiment does not require any cost to develop a matching processing program for the coprocessor separately from one for the host processor. Typically, merely by recompiling a matching processing source program for the host processor for the coprocessor, development of a matching processing program for the coprocessor is completed.

Furthermore, in the matching device 10, the coprocessor interface unit 217 and the host-side control call unit 311 cover complicated communication between the host processor 20 and the coprocessor 30. In this manner, the coprocessor interface unit 217 and the host-side control call unit 311 cover up the complicated communication between the host processor 20 and the coprocessor 30 from the system designer. Additionally, the unit matching control unit 215, 315 allocates unit matching processing to a core that is not currently executing processing in the host processor 20 or the coprocessor 30. Then, the unit matching control unit 215, 315 performs a control for providing new one unit processing to the host processor 20 or the coprocessor 30 that has completed parallel-divided one unit processing.

Thus, it is unnecessary for the system developer to perform complicated performance tuning, such as communication and allocation adjustment for processing allocation to each of the host processor 20 and the coprocessor 30. Accordingly, load on the system developer is reduced.

In addition, as shown in FIG. 10, the operation test may be appropriately performed, as needed, by the host processor side alone and by a combination of the host processor side and the coprocessor side.

As described above, in the present embodiment, the matching device 10 performs the control for executing efficient matching processing and improving matching processing performance instead of the system developer. Thus, all that the system developer needs to do is merely to create a predetermined program as successive processing on the host processor. Accordingly, the application of the present embodiment allows a parallel high-speed matching system using the host processor and the coprocessor to be constructed in a short period of time.

(Second Exemplary Embodiment)

A second exemplary embodiment of the present invention performs data prefetching prior to making access to the registered data set.

A structure of a matching device of the second exemplary embodiment is the same as the structure of the matching device 10 of the first exemplary embodiment. The second exemplary embodiment is only different from the first exemplary embodiment in terms of operation of the block cut-out unit 214 (see FIG. 2). The operations of the other respective unit in the second exemplary embodiment are the same as those of the unit in the first exemplary embodiment. Hereinafter, the second exemplary embodiment will be described, as needed, with reference to the drawings of the first exemplary embodiment.

An operation 214 of the block cut-out unit in the second exemplary embodiment is characterized in that the unit cuts out a block prior to a request from the unit matching control unit 215, then prefetches data of the block, and waits for the request. Operational steps of the block cut-out unit 214 will be described below with reference to FIG. 11. For comparison, FIG. 6 (the operation of the block cut-out unit 214 in the first exemplary embodiment) will also be referred to, as needed.

Figure 11:
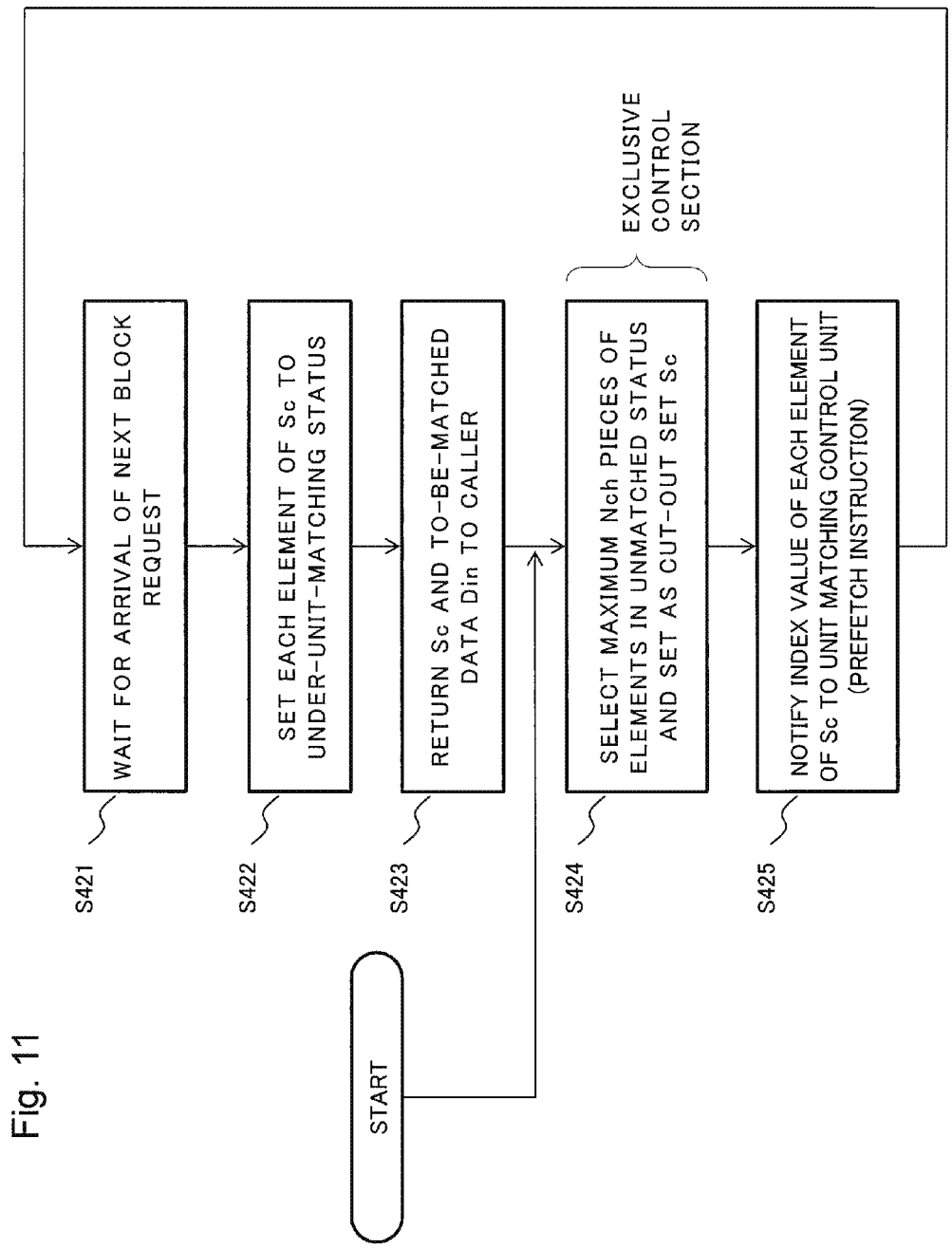
FIG. 11 is a flowchart of operation of a block cut-out unit of a second exemplary embodiment of the present invention.

When the system first starts operation, the block cut-out unit 214 starts operation with step S424 of FIG. 11.

1) Step S424

As with S401 of FIG. 6, maximum Nch pieces of element data in the "unmatched status" are found from the progress management table 241 and a set of the elements is used as a cut-out set Sc.

2) Step S425

The block cut-out unit 214 notifies index values of each element data of registered data to which each element data of the Sc refers to the unit matching control unit 215, 315.

The unit matching control unit 215 receives the instruction and provides the notified index values to the data access unit 222, 322 in the corresponding unit matching unit 22, 32 to obtain a location of the registered data elements. Then, the unit matching control unit 215 prefetches (pre-reads) the location of the registered data elements. The location of the registered data elements is typically a main memory (not shown) of the host processor 20 and the coprocessor 30. In this case, the host processor 20 and the coprocessor 30 prefetch data of the main memory into a cache memory of each of the processors.

When a command set of the host processor 20 or the coprocessor 30 includes an exclusive data prefetching command, the above prefetching can be performed using the command. Alternatively, the prefetching can be performed by discarding download data by using an ordinary memory load command.

3) Step S421

The block cut-out unit 214 waits until a next request comes from the unit matching control unit 215.

4) Step S422

The block cut-out unit 214 receives the next request and sets a procedure status value indicating "under unit matching" to each element data of the progress management table 241 corresponding to each element of the cut-out set Sc prepared at step S424 equivalent to step S402 of FIG. 6).

5) Step S423

The block cut-out unit 214 adds data Din stored in the to-be-matched data storage region 242 located in the progress management table 241 to the cut-out set Sc to return to the unit matching control unit 215 as the caller (equivalent to the latter part of step S403 of FIG. 6).

Unlike the operation of the block cut-out unit 214 in the first exemplary embodiment, the block cut-out unit 214 in the second exemplary embodiment advances execution to step S424 of FIG. 11 and thereafter even after it has replied to the request from the unit matching control unit 215. Then, each step of FIG. 11 is repeatedly executed.

In the second exemplary embodiment, with the above-mentioned prefetching operation, registered data to be accessed is highly likely to be located in the cache memory of the processor at a point in time when the unit matching control unit 215 starts actual one-to-one matching processing. Accordingly, the one-to-one matching processing is performed at high speed, consequently obtaining an effect of improving performance in the matching processing as a whole.

In addition, as a method for prefetching at step S425, there can be various methods besides the above method, according to a specific achievement system or a processor architecture to be used. For example, when a memory space is divided into a high-speed and small-capacity area and a low-speed and large-capacity area and the registered data set 23, 33 is usually located in the low-speed and large-capacity area, a method can be considered in which only relevant data is transmitted to the high-speed and small-capacity area at step S425 in advance. In the present embodiment, determination of a registered data set to be next referred to is made by the block cut-out unit 214. Accordingly, various prefetching techniques for copying data to be referred to in a near feature into a location near the processor can be effectively performed at step S425.

(Third Exemplary Embodiment)

Figure 12:
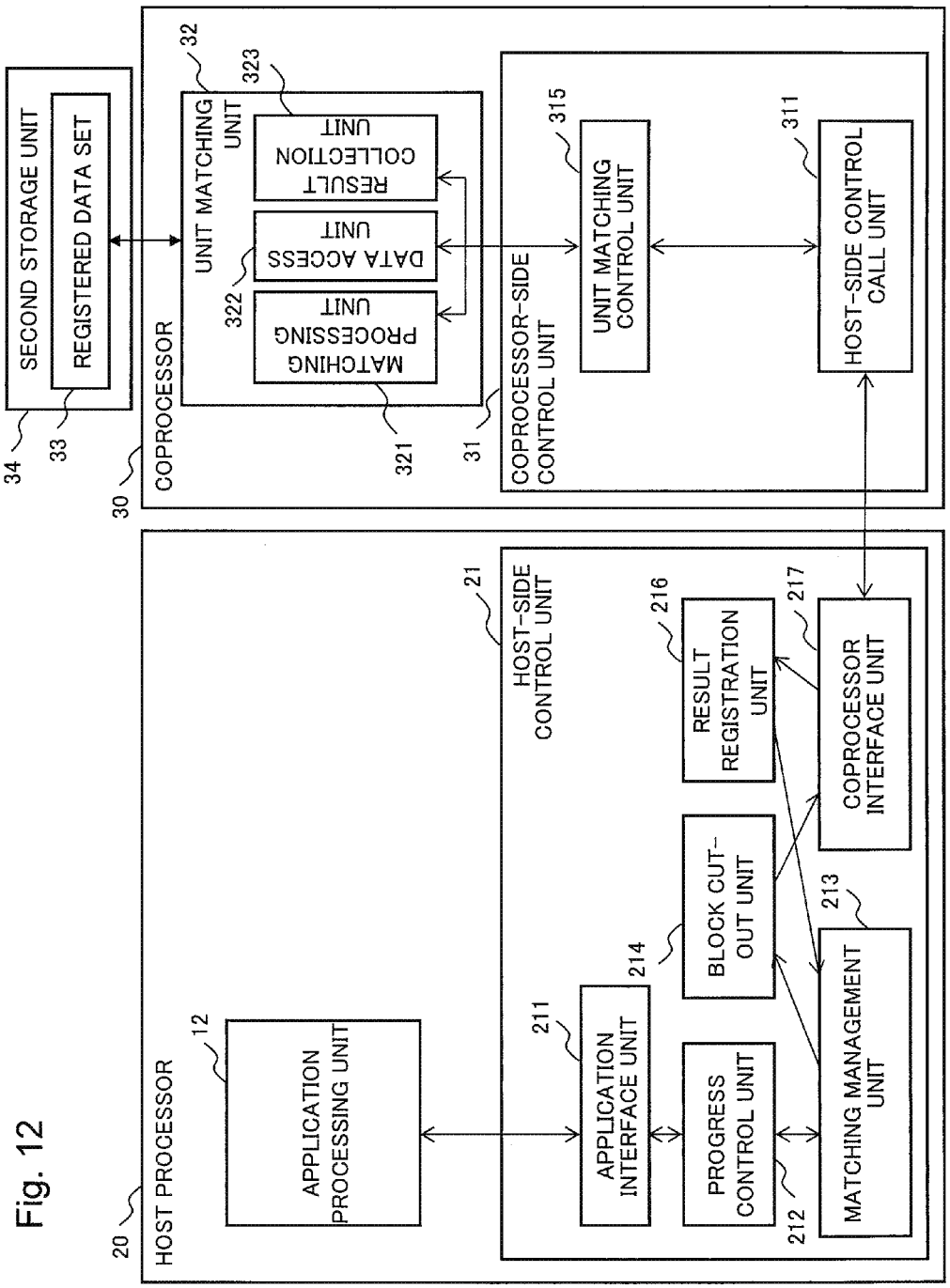
FIG. 12 is a block diagram showing an entire structure of a matching device according to a third exemplary embodiment of the present invention.

In a third exemplary embodiment of the present invention, main body processing of matching is performed only by one coprocessor, and the host processor performs only overall control. FIG. 12 is a block diagram showing an entire structure of a matching device 30 of the third exemplary embodiment. As compared with the matching device 10 of the first exemplary embodiment, the matching device 30 of the third exemplary embodiment does not include a unit matching control unit (the unit matching control unit 215 of FIG. 2) and a unit matching unit (the unit matching unit 22 of FIG. 2) on the host processor 20 side. The other structures of the matching device 30 are the same as those in the matching device 10.

In the third exemplary embodiment, the progress control unit 212 starts only the unit matching control unit 315 on the coprocessor side when the matching device starts matching processing. Cutting out of a block is performed based on a request from the unit matching control unit 315 on the coprocessor side. The main body of matching processing is performed only by the unit matching unit 32 on the coprocessor 30 side. Registration of a result of unit matching processing is performed based on a request from the unit matching control unit 315 on the coprocessor 30 side. The operations of the unit matching control unit 315, the block cut-out unit 314, and the result registration unit 216, which are called from the unit matching control unit 315, are the same as those shown in FIGS. 5, 6, and 7.

In the first exemplary embodiment, exclusive control is performed at steps S401, S402 (FIG. 6) for the operation of the block cut-out unit and step S602 (FIG. 7) for the operation of the result registration unit. On the other hand, in the third exemplary embodiment, these excusive controls are unnecessary. This is because the steps S401, S402, and S602 are not simultaneously called from both of the host processor 20 and the coprocessor 30.

The third exemplary embodiment is suitable when application processing other than matching processing needs to be performed on the host processor 20. The reason for this is that since matching processing is not performed by the host processor 20, resources of the host processor 20 can be allocated to other applications.

The third exemplary embodiment is also applicable when achieving a matching processing-specific system at low cost. This is because, while a parallel type processor good at matching processing can be employed as the coprocessor 30, an inexpensive processor with a relatively low function can be employed as the host processor 20 for overall control. Use of such processors allows reduction in system cost, without reducing matching performance.

(Fourth Exemplary Embodiment)

Figure 13:
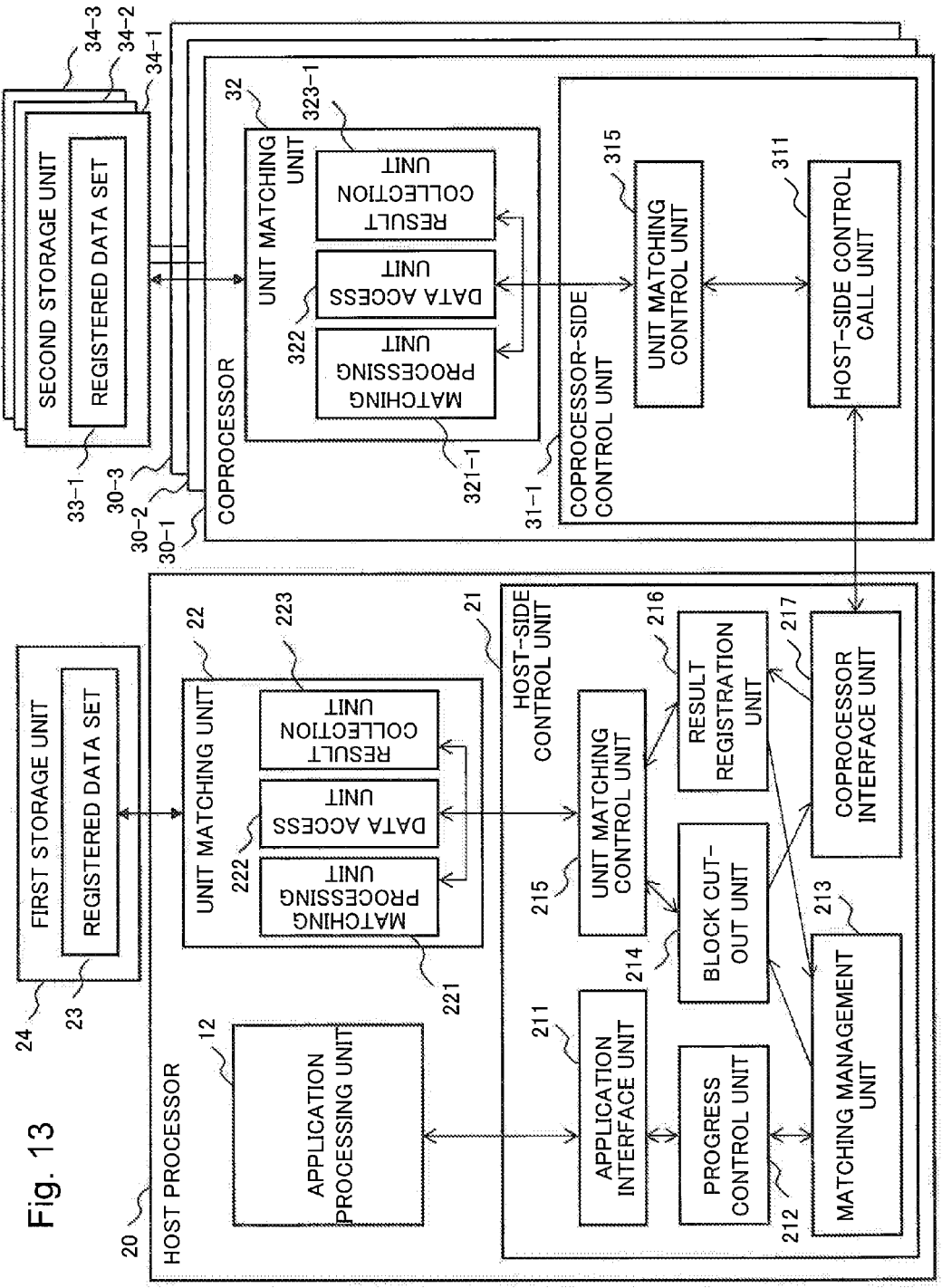
FIG. 13 is a block diagram showing an entire structure of a matching device according to a fourth exemplary embodiment of the present invention.

FIG. 13 is a block diagram showing an entire structure of a matching device 40 of a fourth exemplary embodiment of the present invention. The matching device 40 of the fourth exemplary embodiment is characterized in that it is achieved by a single host processor and a plurality of coprocessors.

The matching processing main body is executed in parallel by respective unit matching unit 32-1 to 32-n on each of coprocessors 30-1 to 30-n (n represents the number of the coprocessors), in addition to the unit matching unit 22 on the host processor 20.

In the fourth exemplary embodiment, respective elements forming the coprocessors 30-1 to 30-n, the host-side control call unit 311, the unit matching control unit 315, the unit matching unit 32, and internal components thereof are arranged in numbers corresponding to the number of the coprocessors. Then, host-side control call unit 311-1 to 311-n of the coprocessors 30-1 to 30-n side are connected to the only one coprocessor interface unit 217 located on the host processor 20 side. Except for those points mentioned above, the other structures of the matching device 40 of the fourth exemplary embodiment are the same as those of the matching device 10 of the first exemplary embodiment.

In the fourth exemplary embodiment, the progress control unit 212 starts, in addition to the unit matching control unit 215 on the host processor 20 side, the respective unit matching control unit 315-1 to 315-n on the coprocessor 30-1 to 30-n when the matching device 40 starts matching processing. These (n+1) pieces of the unit matching control unit make access to the progress management table 241 and the final matching result region 243 in the matching management unit 213 via the block cut-out unit 214 and the result registration unit 216 each one of which is located on the host processor side, so as to advance matching processing in parallel. In that case, the exclusive control imposed on steps S401, S402 of FIG. 6 and step S602 of FIG. 7 ensures that simultaneous accesses from the (n+1) pieces of the unit matching control unit 215 are properly made. Operations of the unit matching control unit 215 and the block cut-out unit 214 and the result registration unit 216 called from the unit matching control unit 215 are the same as those shown in FIGS. 5, 6, and 7.

In addition, registered data sets 33 on the coprocessors 30-1 to 30-n side are arranged one by one with the same content in storage unit 34-1 to 34-n for the respective coprocessors 30-1 to 30-n. Then, the respective unit matching unit 32-1 to 32-n on the coprocessor side execute, as a basic operation, referring to the registered data sets stored in the storage unit 34-1 to 34-n for the corresponding coprocessors 30-1 to 30-n. However, when there is a common storage unit accessible from all of the coprocessors 30-1 to 30-n, only one pair of the coprocessor-side registered data sets may be located in the common storage unit and the unit matching unit 32-1 to 32-n of the coprocessors 30-1 to 30-n side may make access to the registered data sets of the common storage unit.

(Fifth Exemplary Embodiment)

As a specific Example, a description will be given of an example of constructing a member matching system by face matching using the present invention.

Figure 14:
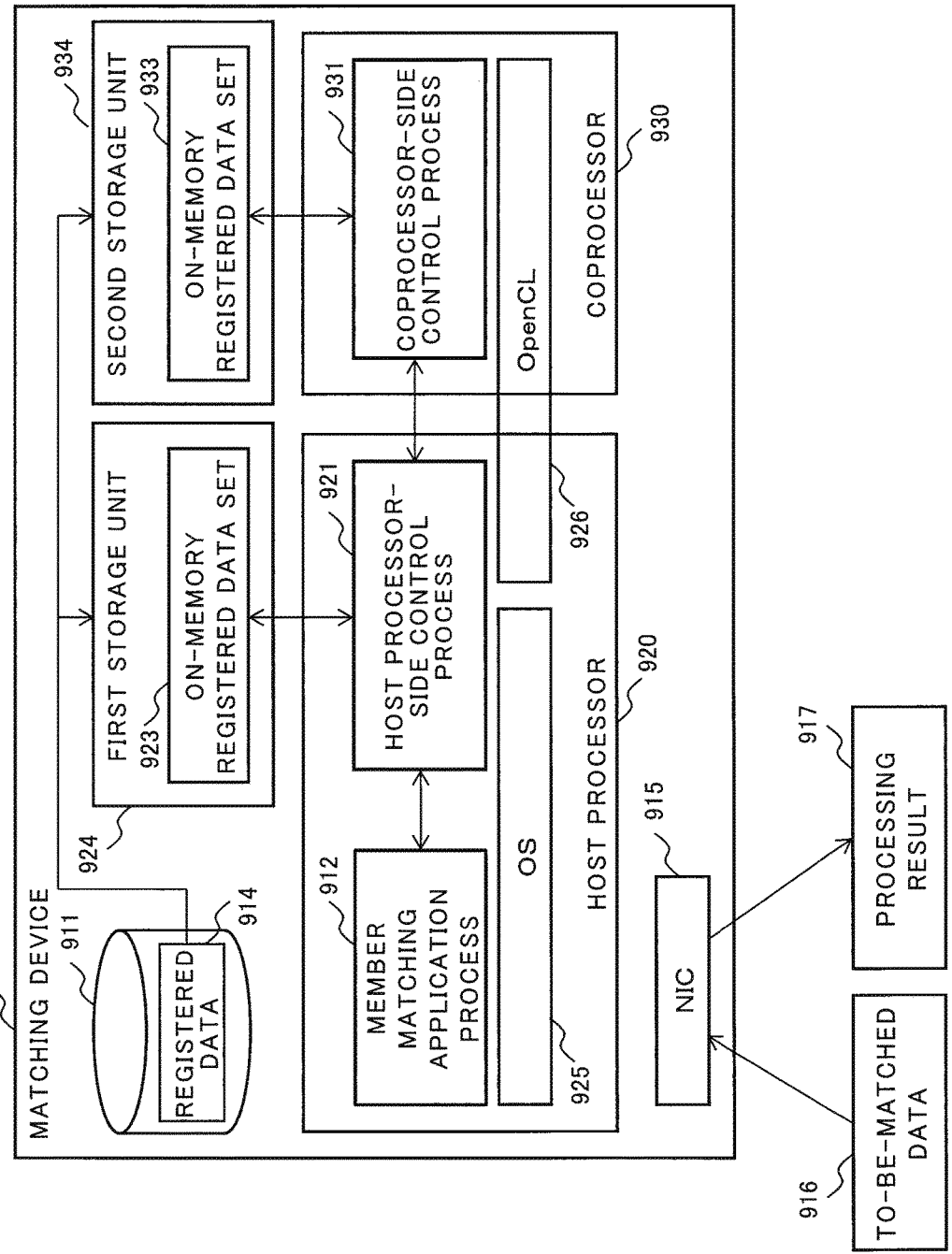
FIG. 14 is a block diagram showing an entire structure of a member matching system according to a fifth exemplary embodiment of the present invention.

FIG. 14 shows an entire structure of the member matching system. A main part of the present embodiment is a matching device 910 that includes the following constituent elements:

1) Host Processor

As a host processor 920, a pair of server microprocessors are used. For example, a commonly commercially available server processor provided with a plurality of cores thereinside can be used.

2) Coprocessor

As a coprocessor 930, a pair of coprocessors connectable to the host processor 920 and supported by OpenCL are used. For example, a commercially available GPU can be used.

3) NIC (Network Interface Card)

A pair of NICs (Network Interface Cards) 915 are used for communication with outside of the matching device 910. For example, a commercially available wired LAN communication card is usable.

4) OS (Operating System)

As an OS (Operating System) 925, an OS that operates on the host processor 920 is used. As an OS that operates on a commercially available server processor, various kinds of products are available on the market.

5) OpenCL Processing System

As a control mechanism of the coprocessor 930, an OpenCL processing system 926 is used that operates on the host processor 920 and the coprocessor 930. As for such a processing system, similarly, various kinds of products are commercially available.

6) Storage Device and Reference Data

A hard disk device 911 storing previously registered data and programs and a facial feature amount data set 914 regarding registered members recorded therein are used. The registered facial feature amount data set 914 is read in on a main memory of the host processor 920 and the coprocessor 930 upon startup of the member matching system and referred to as an on-memory registered data set 923, 933.

A member matching application process 912, a host-side control process 921, and a coprocessor-side control process 931 are software processes that operate on the OS 025 and the OpenCL 926 and incorporate functions corresponding to the application 12, the host-side control unit 21, the unit matching unit 22, the coprocessor-side control unit 31, and the unit matching unit 32 in the first exemplary embodiment. This will be described later.

The matching device 910 includes the constituent elements described above.

The member matching system includes, besides the matching device 910, a recognition camera (not shown) and a display device (not shown).

The recognition camera captures a facial image of a member and converts it into facial feature amount data. Then, the recognition camera inputs the facial feature amount data, as to-be-matched data 916, into the matching device 910.

The display device displays, in a suitable form, a processing result 917 that is result information from matching by the matching device 910.

Figure 15:
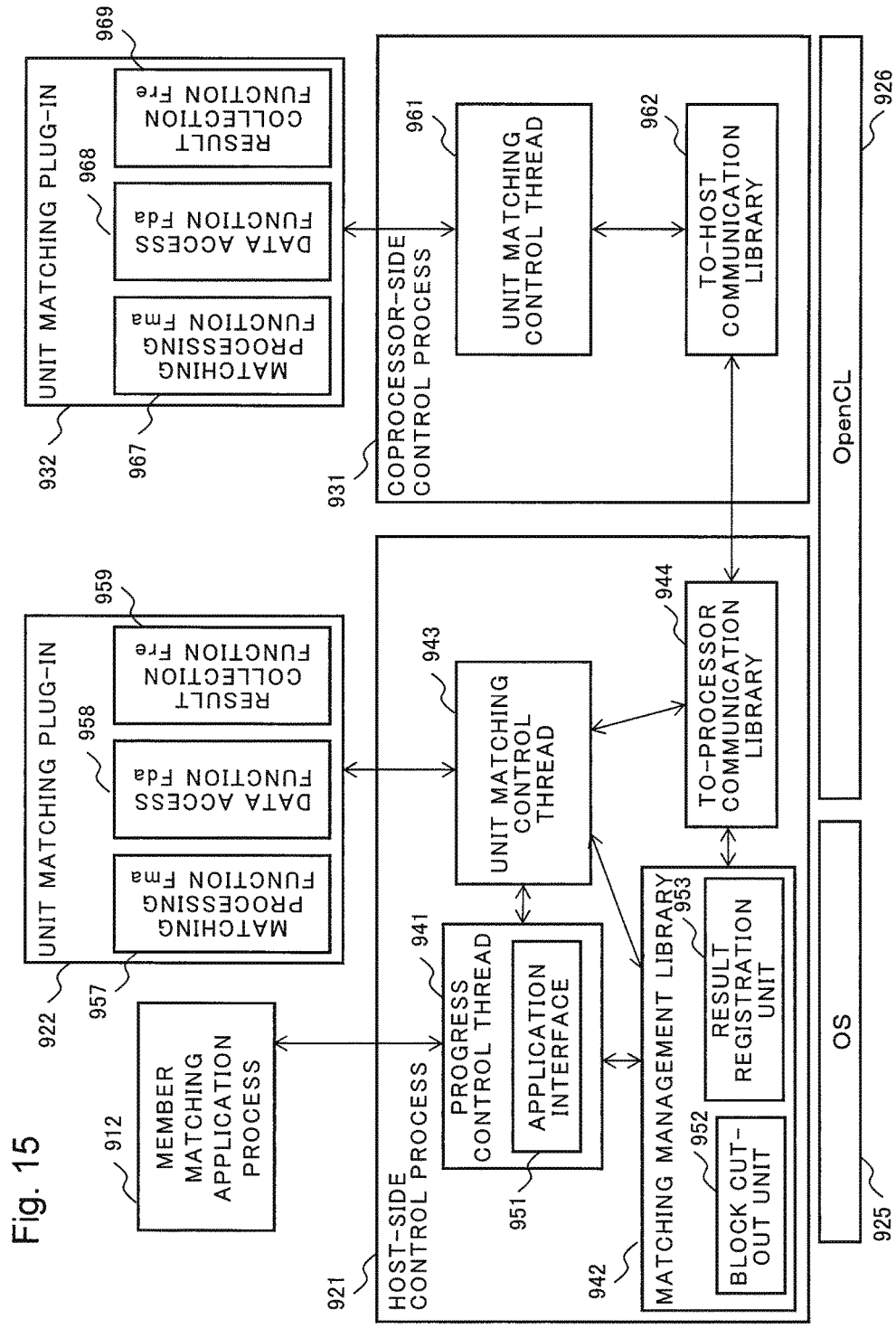
FIG. 15 is a diagram showing an inner structure of software in the member matching system of the fifth exemplary embodiment.

Next, regarding software-related parts that operate on the host processor 920 and the coprocessor 930, a detailed description will be given with reference to FIG. 15. FIG. 15 is a diagram showing an inner structure of software in the member matching system of the fifth exemplary embodiment.

The member matching application process 912 and the host-side control process 921 are software processes on the OS 925 of the host processor. Both processes communicate with each other via an interprocess communication mechanism supported by the OS, such as Socket.

The coprocessor-side process 931 is software using an OpenCL API (Application Program Interface) of the coprocessor and communicates with the host-side control process 921 by using the OpenCL function.

The host-side control process 921 includes a progress control thread 941 (equivalent to the progress control unit 212 of FIG. 2), a unit matching control thread 943 (equivalent to the unit matching control unit 215 of FIG. 2), a matching management library 942 (equivalent to the matching management unit 213 of FIG. 2), and a to-coprocessor communication library 944 (equivalent to the coprocessor interface unit 217 of FIG. 2). The matching management library 942 and the to-coprocessor communication library 944 are called from the progress control thread 941 and the unit matching control thread 943. The progress control thread 941 and the unit matching control thread 943 are generated upon start of the system and continue to exist throughout a system operation period.

The matching management library 942 includes a block cut-out unit 952 (equivalent to the block cut-out unit 214 of FIG. 2) and a result registration unit 953 (equivalent to the result registration unit 216 of FIG. 2). In addition, the matching management library 942 has data structures corresponding to a progress management table (the progress management table 241 of FIG. 4), to-be-matched data (the to-be-matched data 242 of FIG. 4), and a final matching result (the final matching result 243 of FIG. 4) thereinside.

A unit matching plug-in 922 is connected to the host-side control process 921. The unit matching plug-in 922 is a software function group created according to a predetermined specification by the system developer that includes three functions, which are: a matching processing function 957, a data access function 958, and a result collection function 959. The matching processing function 957, the data access function 958, and the result collection function 959, respectively, are software for the host processor 920 that achieve functions corresponding to the matching processing unit 221, the data access unit 222, and the result collection unit 223 of FIG. 2.

The coprocessor-side control process 931 includes a unit matching control thread 961 (equivalent to the unit matching control unit 315 of FIG. 2) and a to-host communication library 962, which is called from the unit matching control thread 961. The unit matching control thread 961 is created upon start of the system and continues to exist throughout the system operation period.

As with the host processor 1-side control process 921, a unit matching plug-in 932 is connected to the coprocessor-side control process 931. The unit matching plug-in 932 includes each function, i.e., a matching processing function 967, a data access function 968, and a result collection function 969. Functions of the matching processing function 967, the data access function 968, and the result collection function 969, respectively, are the same as those of the matching processing function 957, the data access function 958, and the result collection function 959 included in the unit matching plug-in 922 on the host side. However, the functions of the matching processing function 967, the data access function 968, and the result collection function 969, respectively, are those achieved by software for the coprocessor.

In addition, accesses to the data structures on the host processor 20 side or exchange of control information with the host-side control process 921 by the unit matching control thread 961 of the coprocessor-side control process 931 and each function of the unit matching plug-in 932 are performed via the to-host communication library 962, without directly calling the OpenCL API.

The progress control thread 941 has an application interface function 951 (equivalent to the application interface unit 211 of FIG. 2) thereinside. The progress control thread 941 receives a matching request from the member matching application process 912 and calls the matching management library 942 to initialize the progress management table therein. Then, the progress control thread 941 notifies to the unit matching control thread 943, 961 of each of the host-side control process 921 and the coprocessor-side control process 931 to cause operation of the unit matching control thread 943, 961 to be started.

Operations of each thread and each library of the host processor 920 side and the coprocessor 930 side, and each function unit of the threads and libraries thereof are the same as those described in the first exemplary embodiment.

Then, next will be a description of the unit matching plug-in 922, 932 unique in the present embodiment and the unit matching control threads 943, 961 controlling them. Hereinafter, although the host processor 930 side will be described as an example, the same will apply to the coprocessor 930 side.

The unit matching plug-in 922 includes the three functions: the matching processing function 957, the data access function 958, and the result collection function 959, as mentioned above.

A matching processing function Fma is a function that receives one to-be-matched data Din and one registered data element Dst as input and returns a matching result score value R as a result of matching of the to-be-matched data Din and the registered data Dst. The to-be-matched data Din and the registered data Dst are passed for reference, that is, as pointers to a location of actual data, passed to the matching processing function Fma. The matching processing function Fma performs only referring to actual data of the to-be-matched data Din and the registered data Dst and does not perform changing of the actual data. In addition, the matching processing function Fma is incorporated by taking measures, such as using a stack region to store temporary work data, so that the function is multithread safe.

A data access function Fda is a function that receives an index "i" of the registered data element as input and returns an offset value of a location of the data element from a head of the registered data set. When each data element is fixed in length, the offset value is easily obtained as a product of the index value and an element size. On the other hand, when the data element is variable in length, the offset value is obtained using separately prepared index data or the like.

A result collection function Fre is a function used for recursive matching result calculation. The result collection function Fre is given, as input, two pairs (i, Ri), each being a pair of "i" and "Ri". Herein, "i" represents an index value of registered data element, and "Ri" represents a matching result score value resulting from matching of to-be-matched data and an i-th data element. A result collection function Fre compares the two pairs of input to select a pair having a best score and returns the pair (i, Ri).

Since the above three functions: the matching processing function Fma, the data access function Fda, and the result collection function Fre have the same functions also in the coprocessor 930 side, a description of the functions will be omitted.

Figure 16:
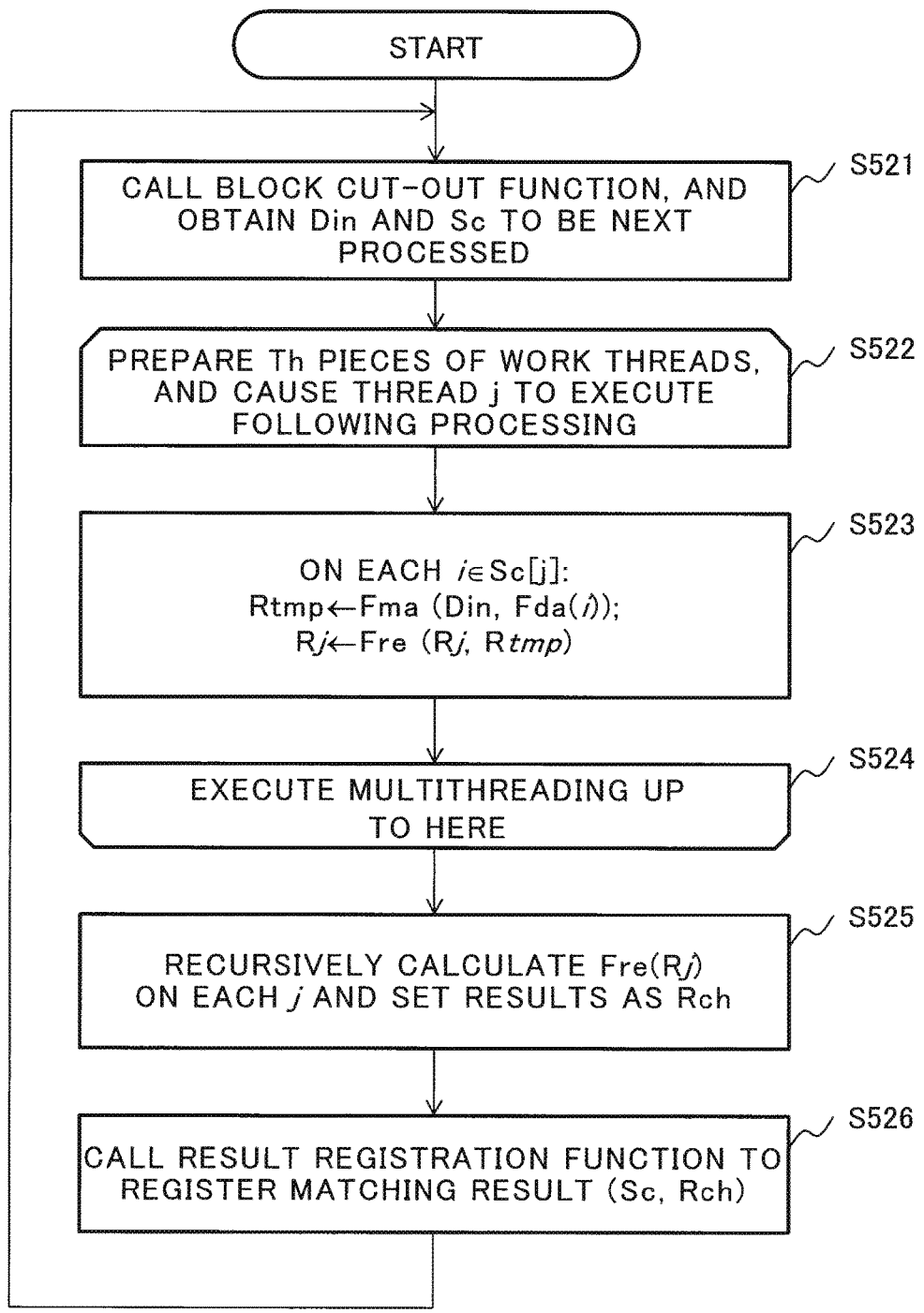
FIG. 16 is a flowchart of operation of a unit matching control thread of the fifth exemplary embodiment.

Next, a description will be given of operation of the unit matching control thread 943 with reference to FIG. 16.

1) Step S521

The unit matching control thread 943 calls a block cut-out function 952 in the matching management library 942 to obtain a set Sc of a block and to-be-matched data Din that are to be next processed by the host processor 920 in which the unit matching control thread 943 is operating. The processing of S521 is processing equivalent to step S501 of FIG. 5.

2) Step S522

The unit matching control thread 943 creates Th pieces of threads as work threads on the host processor 920 in which the unit matching control thread 943 is operating. The threads are created using a thread library provided by the OS or an OS-related existing middle ware, for example, POSIX (Portable Operating System Interface) thread or OpenMP (Open Multiprocessing, registered trademark). The Th is equivalent to the number of threads of the host processor 20 usable for execution of the unit matching unit 22 on the host side in the first exemplary embodiment. In the present embodiment, the Th is equivalent to the number of threads of the host processor 920 usable for execution of the unit matching plug-in 922. The unit matching control thread 943 causes each of the Th pieces of threads to perform processing of next step S523, then, synchronizes completion of the processing by the Th pieces of threads, and goes to processing of step S525.

3) Step S523

The unit matching control thread 943 initializes a partial result Rj and then executes the following processing (3-1) and (3-2) on each element i of a subset Sc[j].

(3-1): The unit matching control thread 943 calls the data access function Fda using "i" as an argument, and additionally calls the matching processing function Fma using a return value of the data access function Fda and the Din as arguments to cause a return value of the matching processing function Fma to be Rtmp.

(3-2): The unit matching control thread 943 calls the result collection function Rre using Rj and Rtmp as arguments to set a return value of the function Fre again to Rj.

As used herein, the Sc[j] represents a subset allocated to a j-th work thread of the set Sc and is a set composed of "N/Th" pieces of elements from "N/Th*j"-th to "N/Th*(j+1)−1"-th of the Sc (see the description of steps S502 to S504 in the first exemplary embodiment).

The processing of step S523 serves to maintain information regarding an element that gives a best matching result in the matching processing part allocated to the j-th work thread, as a final result of the Rj updated by the j-th work thread.

In addition, the series of processing from S522 to S523 is executed in a multithreaded manner. In FIG. 15, a final step executed in the multithreaded manner is shown as S524.

4) Step S525

The unit matching control thread 943 recursively applies the result collection function Fre to each Rj obtained at step S523 to obtain a best matching result Rch on the given Sc.

In addition, in the first exemplary embodiment, calculation of the best matching result on the Sc is collectively performed after completion of parallel processing (step S505 of FIG. 5). In contrast, in the present embodiment, calculation of the best matching result of the part allocated to the j-th work thread is performed by the j-th work thread itself (step S523). After that, calculation of a best matching result on partial results (Th pieces in total) obtained by each work thread is performed (step S525). By the predetermined as above, time necessary for the best matching result calculation is reduced.

5) Step S526

The unit matching control thread 943 calls a result registration function 953 in the matching management library 942 to register a best matching result on the Sc given at step S521. The processing of S526 is processing equivalent to step S505 of FIG. 5.

Respective steps from S521 to S526 are operations of the unit matching control thread 943 on the host processor 920 side. Operations of the unit matching control thread 961 on the coprocessor 930 side are also the same as those above.

However, the unit matching control thread 961 makes access to the data structures on the host processor 920 side via the to-host communication library 962. In other words, the operation of the unit matching control thread 961 on the coprocessor 930 side is different from the operation of the unit matching control thread 943 on the host processor 920 side in terms of the following two points:

1') Step S521 on Coprocessor Side

The unit matching control thread 961 calls the block cut-out function 952 in the matching management library 942 on the host processor 920 side via the to-host communication library 962.

5') Step S526 on Coprocessor Side

The unit matching control thread 961 calls the result registration function 953 in the matching management library 942 on the host processor 920 side via the to-host communication library 962.

While the fifth exemplary embodiment has used the example of facial image matching, processing to which the matching device of the present embodiment is applicable is not limited to facial image matching. Specifically, the matching device of the present embodiment is applicable to various matching systems, such as matching of various kinds of biological information such as iris and finger prints, matching of character string information, and matching of time-series change information on waveforms or the like.

(Sixth Exemplary Embodiment)

The matching processing in the first to the fifth exemplary embodiments is processing for determining the presence or absence of matching between two pieces of information or for obtaining a degree of similarity therebetween. As is obvious from the descriptions of the first to the fifth exemplary embodiments, a specific content of matching processing, for example, a method for determining the presence or absence of matching, and a definition of the degree of similarity and a calculation method therefor are not important in the present invention. The present invention relates to the technique in which when executing a predetermined "unit processing" repeated a plurality of times on "two information sets", unit processing is performed a plurality of times by dividing at least one of the information sets so as to allow parallel processing. For example, the "two information sets" and the "unit processing", respectively, represent the cut-out set and the to-be-matched data, and the one-to-one matching processing, respectively, in the first exemplary embodiment. Thus, the unit processing in the first exemplary embodiment is processing in which matching processing forming an entire part of target processing is divided in parallel and processed in parallel.

The unit processing may be single processing that is repeatedly executed in the same content, and does not need to be processing set by dividing target processing in parallel. Unit processing as single processing is, for example, such processing that performs the same unit processing on n pieces of data or data pairs to obtain n pieces of results. In this case, the n pieces of results are independent and do not need to be integrated into a smaller number of results than the n pieces. The matching processing shown in the exemplary embodiments is an example in which the results of the n pieces of unit processing are integrated into one final result.

The input for the matching processing in the exemplary embodiments is the two sets: the registered data set and the to-be-matched data. Input for unit processing may be combinations of data composed of element data of each of three or more data sets, according to a content of the unit processing.

When the input for unit processing is a combination of data composed of element data of each of two or more data sets, numbers of pieces of the element data of each data set do not need to be the same. For example, a data set including m pieces of element data and a data set including n pieces of element data may be used as input data sets to perform unit processing on (m×n) pieces of pairs of each element data. In the unit processing shown in the exemplary embodiments, the data set including one to-be-matched data and the registered data set including the n pieces of registered data elements are used as input to execute the unit processing. Furthermore, in the matching processing shown in the exemplary embodiments, the results of the n pieces of unit processing are integrated into one final result.

The input for unit processing does not need to be a combination of data composed of element data of each of two or more data sets. Unit processing may be executed on element data of one data set. An example of such processing is processing in which, for example, n pieces of element data are subjected to the same calculation such as squaring calculation to obtain n pieces of results. In this case, there may be performed processing for integrating into a smaller number of final results than the n pieces, such as adding all the n pieces of calculation results.

The above integration processing for integrating a plurality of results of unit processing into a smaller number of final results than that is processing independent from the unit processing. Accordingly, a main constituent element executing the integration processing may be any of the processors performing parallel processing or a processor other than the processors performing parallel processing.

Figure 17:
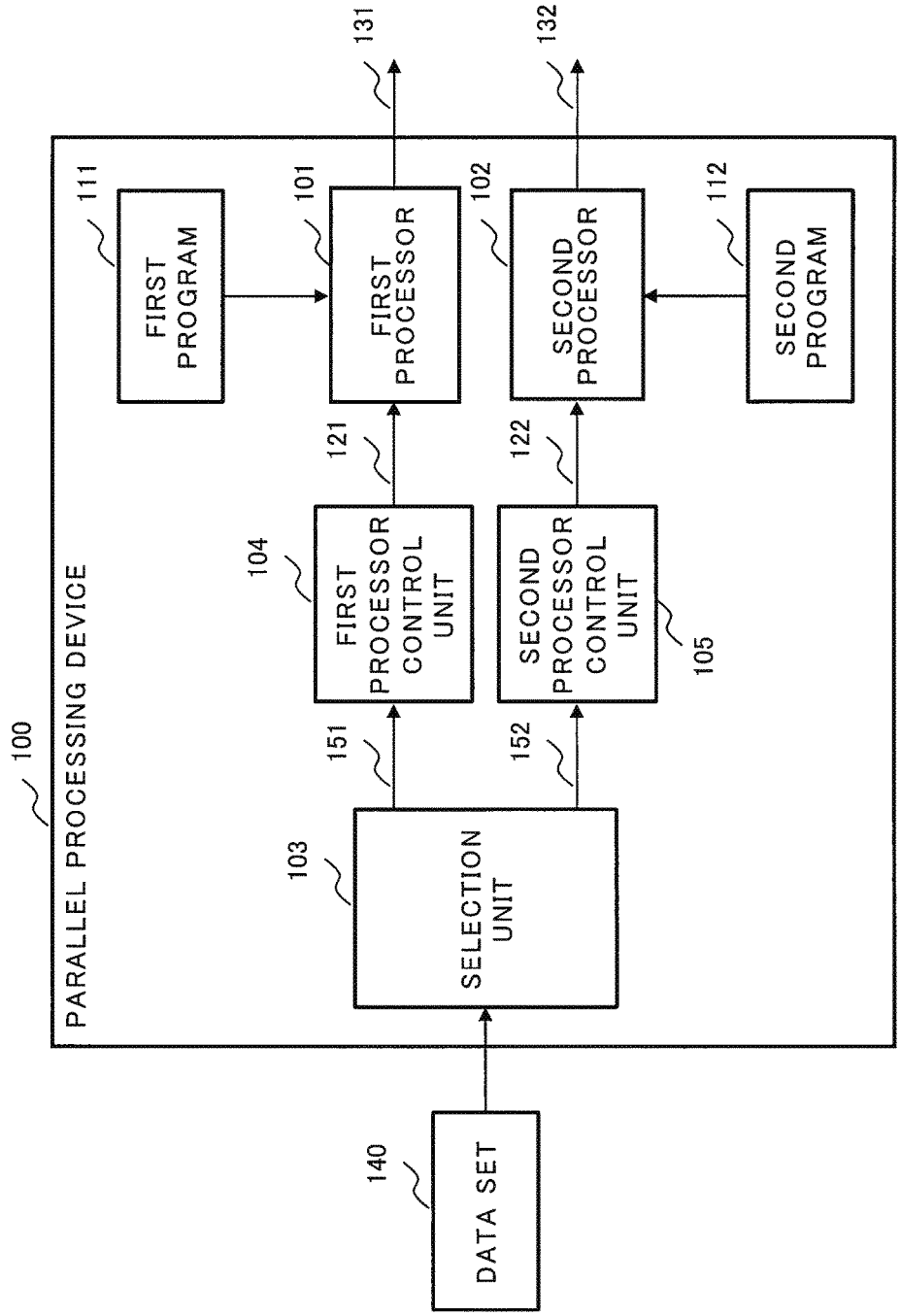
FIG. 17 is a block diagram showing a structure of a processing device according to a sixth exemplary embodiment of the invention.

To summarize the above, an essential structure included in the parallel processing device of the present invention is one as shown in FIG. 17. FIG. 17 is a block diagram showing a structure of a parallel processing device 100 of a sixth exemplary embodiment.

The parallel processing device 100 includes a first processor 101, a second processor 102, a selection unit 103, a first processor control unit 104, and a second processor control unit 105.

The selection unit 103 selects a first subset 151 and a second subset 152 from a data set 140 based on a predetermined index indicating performance or function of the first processor 101 and the second processor 102. The index indicating performance or function of the processors is, for example, a number of processing executable in parallel using the first processor 101 and the second processor 102. Specifically, as the index, there can be used a total number of the processors ("2" in the present embodiment), a number of threads of each of the first processor 101 and the second processor 102 usable for executing unit processing, or the like.

The first processor control unit 104 inputs first data 121 included in the first subset 151 into the first processor 101. The second processor control unit 105 inputs second data 122 included in the second subset 152 into the second processor 102.

The first processor 101 executes a first program 111. The first program 111 prescribes a processing procedure of unit processing to be executed using the data included in the data set 140 as input. The first processor 101 executes the unit processing prescribed in the first program 111 on the input first data 121 to output a first result 131.

The second processor 102 executes a second program 112. The second program 112 also prescribes a processing procedure of unit processing to be executed using the data included in the data set 140 as input, which has the same content as that of the first program 111. The second processor 102 executes the unit processing prescribed in the second program 112 on the input second data 122 to output a second result 132.

As described above, the parallel processing device 100 processes in parallel the data included in the one data set 140 by using the first processor 101 and the second processor 102. The selection of the first input data 121 to be processed by the first processor 101 and the second input data 122 to be processed by the second processor 102 from element data of the data set 140 is performed by the selection unit 103. In addition, inputting of the first data 121 and the second data 122 into the first processor 101 and the second processor 102 is performed by the first processor control unit 104 and the second processor control unit 105, respectively.

Accordingly, a user of the parallel processing device 100 may prepare processing to be executed on the first data 121 and the second data 122 that are element data included in the data set 140, as the first program 111 and the second program 112 having the same content. In other words, the parallel processing device 100 can efficiently and easily perform in parallel the plurality of pieces of unit processing by the plurality of processors.

In addition, no limitation is intended to be placed on specific achieving unit for the selection unit 103, the first processor control unit 104, and the second processor control unit 105.

Specifically, the selection unit 103 may be achieved by software processing performed by execution of a predetermined processing program by the first processor 101, the second processor 102, or a third processor (not shown) other than the first and the second processors 101 and 102.

The first processor control unit 104 may be achieved by software processing performed by execution of a predetermined processing program by the first processor 101 or the third processor.

The second processor control unit 105 may be achieved by software processing performed by execution of a predetermined processing program by the second processor 102 or the third processor. Alternatively, each of the selection unit 103, the first processor control unit 104, and the second processor control unit 105 may be achieved by exclusive hardware.

(Seventh Exemplary Embodiment)

Figure 18:
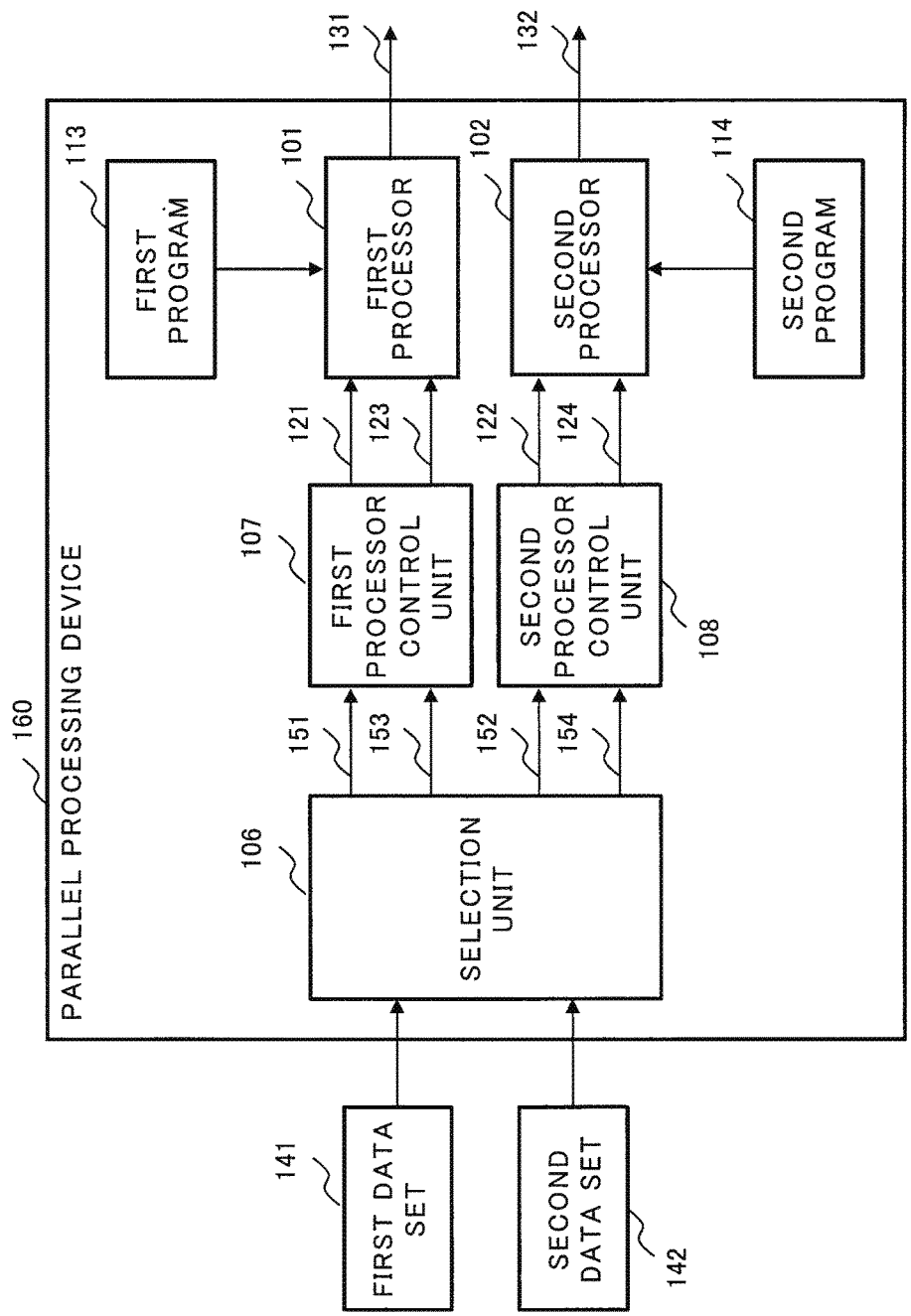
FIG. 18 is a block diagram showing a structure of a processing device according to a seventh exemplary embodiment of the invention.

FIG. 18 is a block diagram showing a structure of a parallel processing device 160 of a seventh exemplary embodiment. The parallel processing device 160 of the seventh exemplary embodiment executes in parallel unit processing using element data of two data sets as input.

The parallel processing device 160 includes a first processor 101, a second processor 102, a selection unit 106, a first processor control unit 107, and a second processor control unit 108.

The selection unit 106 selects a first subset 151 and a second subset 152 from a first data set 141 based on a predetermined index indicating performance or function of the first processor 101 and the second processor 102. Similarly, the selection unit 106 selects a third subset 153 and a fourth subset 154 from a second data set 142 based on the above predetermined index.

The first processor control unit 107 inputs first data 121 included in the first subset 151 and third data 123 included in the third subset 153 into the first processor 101. The second processor control unit 108 inputs second data 122 included in the second subset 152 and fourth data 124 included in the fourth subset 154 into the second processor 102.

The first processor 101 executes a first program 113. The first program 113 prescribes a processing procedure of unit processing to be executed using, as input, the two data included in the first data set 141 and the second data set 142. The first processor 101 executes the unit processing prescribed the first program 113 on the input first data 121 and third data 123 to output a first result 131.

The second processor 102 executes a second program 114. The second program 114 also prescribes a processing procedure of unit processing to be executed using, as input, the two data included in the first data set 141 and the second data set 142, which has the same content as that of the first program 113. The second processor 102 executes the unit processing prescribed in the second program 114 on the input second data 122 and fourth data 124 to output a second result 132.

As described above, the parallel processing device 160 processes in parallel the data included in the two data sets by using the first processor 101 and the second processor 102. The selection of the two input data 122 to be processed by the first processor 101 and the second processor 102 from element data of the first data set 141 and the second data set 142 is performed by the selection unit 106. In addition, inputting of the two data into the first processor 101 and the second processor 102 is performed by the first processor control unit 107 and the second processor control unit 108, respectively. Accordingly, a user of the parallel processing device 160 may prepare processing to be executed on the element data included in each of the first data set 141 and the second data set 142, as the first program 113 and the second program 114 having the same content. In other words, the parallel processing device 160 can efficiently and easily perform in parallel the plurality of pieces of unit processing by the plurality of processors.

Figure 19:
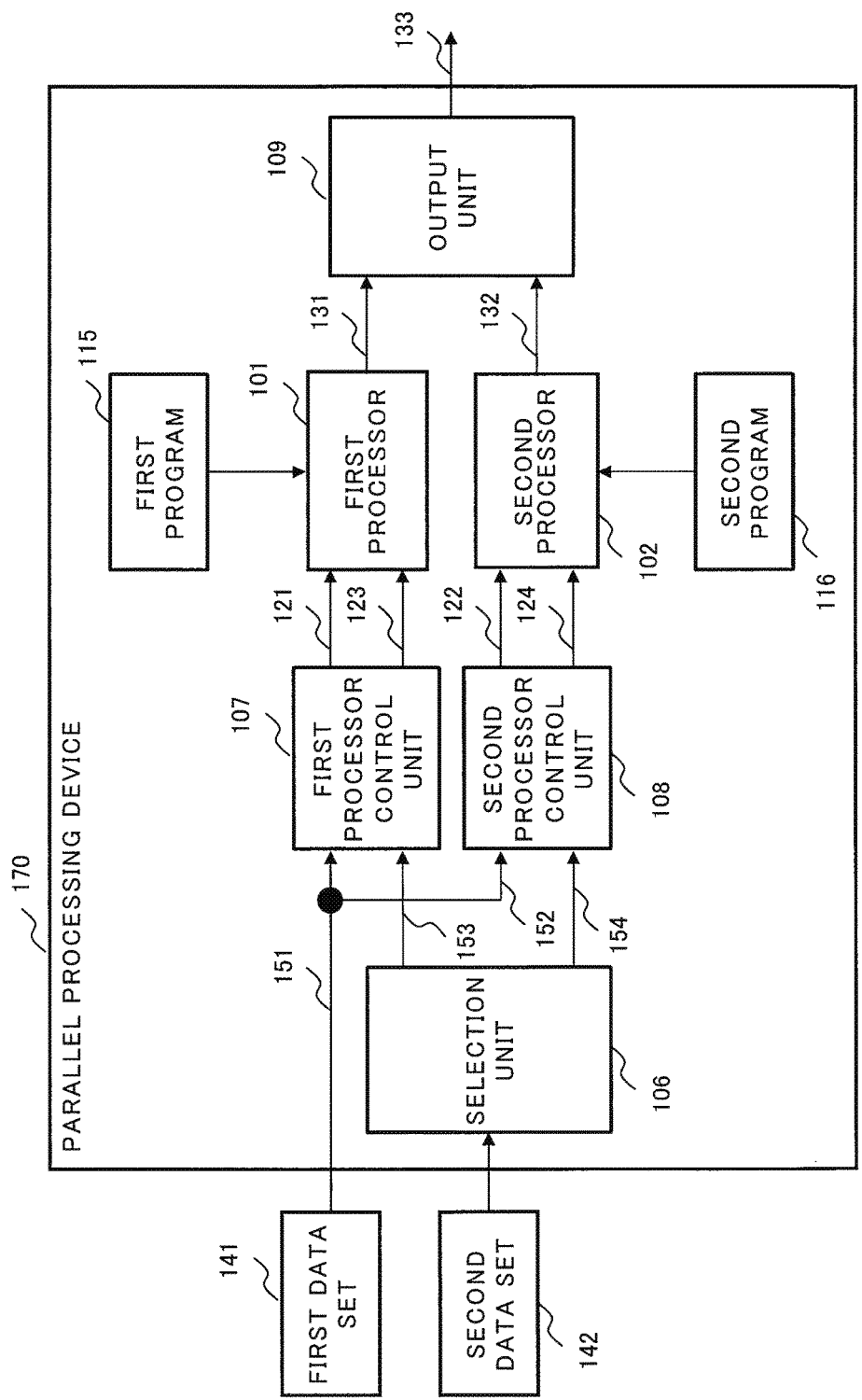
FIG. 19 is a block diagram showing a structure of a modification of the processing device of the seventh exemplary embodiment of the invention.

FIG. 19 is a block diagram showing a structure of a modification of the parallel processing device of the seventh exemplary embodiment. A parallel processing device 170 of the seventh exemplary embodiment element executes, in parallel, unit processing using, as input, element data of two data sets: a first data set 141 and a second data set 142. However, the first data set 141 is a fixed data set. The fixed data set unit a set whose data elements are not selected by the selection unit 103. Specifically, a set of to-be-matched data as input data from outside in the matching devices of the first to the fifth exemplary embodiments is equivalent to the first data set 141 of the present embodiment and the registered data set therein is equivalent to the second data set.

The first processor 101 and the second processor 102, respectively, execute a first program 115 and a first program 116.

Furthermore, the parallel processing device 170 includes an output unit 109, in addition to the constituent elements of the parallel processing device 160. The output unit 109 generates one final result from a plurality of processing results obtained as a result of a plurality of times of execution of unit processing, according to a predetermined criterion, and outputs the generated final result.

When n pieces of unit processing results are integrated into one final result, the integration processing may be performed every time a unit processing result is output. In this case, both of the unit processing and the integration processing can be efficiently and easily performed in parallel by the plurality of processors.

Alternatively, the integration processing may be performed after all of the n pieces of unit processing results are obtained. In this case, parallel processing can be performed only for unit processing.

In addition, similarly, in the present embodiment, no limitation is intended to be placed on specific achieving unit for the selection unit 106, the first processor control unit 107, and the second processor control unit 108.

Specifically, the selection unit 103 may be achieved by software processing performed by the first processor 101, the second processor 102, or a third processor (not shown) other than the first and the second processors 101 and 102. The first processor control unit 104 may be achieved by software processing by the first processor 101 or the third processor. The second processor control unit 105 may be achieved by software processing by the second processor 102 or the third processor.

Alternatively, each of the selection unit 103, the first processor control unit 104, and the second processor control unit 105 may be achieved by exclusive hardware.

In addition, the host processor and the coprocessor in the present invention can be incorporated in various forms in the processing device. For example, the host processor and the coprocessor may be incorporated as individually separate processor chips in the processing device. Alternatively, one of two or more CPU cores incorporated in one processor chip may be used as a host processor and the other one thereof may be used as a coprocessor. In other words, as long as the processing device logically incorporates a plurality of CPUs, at least one of the CPUs may be used as a host processor and the other one(s) thereof may be used as coprocessor(s), whereby the present invention is applicable. No limitation is intended to be placed on a specific chip structure of the plurality of CPUs used as the one or more host processors and coprocessors.

The programs in the present invention may be stored in a semiconductor storage device such as a ROM (Read Only Memory), a RAM (Random Access Memory), or a flash memory, or a non-transitory medium such as an optical disk, a magnetic disk, or an optomagnetic disk.

In addition, each of the exemplary embodiments described above can be combined with any of the other exemplary embodiments.

Some or all of the exemplary embodiments can be described as the following Supplementary Notes, although not limited thereto.

(Supplementary Note 1)

A parallel processing device characterized by including:

a first processor executing, on input data, a first program that prescribes unit processing to be executed by using data included in data sets as the input data to output a first result;

a second processor executing a second program that prescribes the unit processing on the input data to output a second result;

a selection unit selecting a first subset and a second subset from the data set based on a predetermined index indicating performance or function of the first processor and the second processor;

a first processor control unit inputting first data included in the first subset to the first processor; and a second processor control unit inputting second data included in the second subset to the second processor, the first program and the second program being executed in parallel by the first processor and the second processor.

(Supplementary Note 2)

The parallel processing device according to Supplementary Note 1, characterized in that the first program and the second program prescribe the unit processing to be executed by using data included in a first data set in the data sets and data included in a second data set in the data sets as the input data;

the selection unit selects the first subset and the second subset from the first data set and selects a third subset and a fourth subset from the second data set based on the index;

the first processor control unit inputs the first data included in the first subset and third data included in the third subset to the first processor; and the second processor control unit inputs the second data included in the second subset and fourth data included in the fourth subset to the second processor.

(Supplementary Note 3)

The parallel processing device according to Supplementary Note 1 or 2, characterized in that the index indicates a number of pieces of processing executable in parallel using the first processor and the second processor.

(Supplementary Note 4)

The parallel processing device according to any one of Supplementary Notes 1 to 3 characterized by including an output unit outputting the first result or the second result as a final result based on a predetermined determination criterion.

(Supplementary Note 5)

The parallel processing device according to Supplementary Note 1, characterized in that the first program and the second program prescribe the unit processing to be executed by using data included in a first data set in the data sets and data included in a second data set in the data sets including at least two pieces of data as the input data;

the selection unit selects a third subset and a fourth subset from the second data set based on the index;

the first processor control unit inputs the first data included in the first data set and third data included in the third subset into the first processor;

the second processor control unit inputs the second data included in the second data set and fourth data included in the fourth subset into the second processor;

the unit processing is matching processing that performs matching of the first data as to-be-matched data included in the first data set and the second data as registered data included in the second data set preregistered and matching of the input third data as the to-be-matched data and the fourth data as the registered data to calculate a matching score indicating a degree of matching between the to-be-matched data and the registered data; and, further including an output unit outputting the registered data with which the matching score is highest as the final result.

(Supplementary Note 6)

The parallel processing device according to Supplementary Note 5, characterized in that the first processor achieves, by executing a predetermined third program, a matching management unit managing a progress status of the matching processing, a block cut-out unit selecting a set of the registered data unmatched as a block from the registered data set, a result registration unit obtaining the final result from the output unit to notify the progress status to the matching management unit and obtaining the registered data with which the matching score regarding an entirety of the registered data set is highest, and a first communication unit performing communication between the block cut-out unit, the result registration unit, and the result registration unit on a coprocessor;

the second processor achieves, by executing a predetermined fourth program, a unit matching unit performing matching processing between a pair of pieces of data, and a unit matching control unit executing the matching processing of each data of the block and the to-be-matched data to obtain the matching score highest in the block as the final result; and the first processor and the second processor process in parallel matching of the registered data in the block and the to-be-matched data.

(Supplementary Note 7)

The parallel processing device according to Supplementary Note 6, characterized by including:

a first unit matching unit performing the matching processing on the first processor and according to a predetermined specification;

a second unit matching unit performing the matching processing on the second processor according to the specification; and a matching management unit located on the first processor and managing a progress status of matching processing of each data of the registered data set and the to-be-matched data, the selection unit being located on the first processor and selecting a set of one or more pieces of unmatched data as a block from the registered data set, the first processor control unit providing each data of the selected block and the to-be-matched data to the first processor to cause the matching processing to be performed in parallel and obtaining a highest matching score in the block as a first result, the second processor control unit providing each data of the selected block and the to-be-matched data to the second processor to cause the matching processing to be performed in parallel and obtaining a highest matching score in the block as a second result, and the output unit obtaining the final result based on the first result and the second result.

(Supplementary Note 8)

The parallel processing device according to any one of the Supplementary Notes 1 to 7, in which the first processor control unit prefetches the second data to be input to the first processor, from the first subset;

the second processor control unit prefetches the second data to be input to the second processor, from the second universal set.

(Supplementary Note 9)

The parallel processing device according to any one of Supplementary Notes 5 to 8, characterized in that the first program is a program using a first language for the first processor converted from a common program that prescribes the data processing procedure using a predetermined common language;

the second program is a program using a second language for the second processor converted from the common program.

(Supplementary Note 10)

A parallel processing method characterized by including:

selecting a first subset and a second subset from a data set based on a predetermined index indicating performance or function of a first processor and a second processor included in a parallel processing device;

inputting first data included in the first subset into the first processor;

inputting second data included in the second subset into the second processor;

executing, on the first data, by using the first processor, a first program that prescribes unit processing to be executed by using, as input, data included in the data set to output a first result; and executing a second program that prescribes the unit processing on the second data by using the second processor in parallel with the first program to output a second result.

(Supplementary Note 11)

A non-transitory storage medium characterized by storing a parallel processing program, the parallel processing program being for causing processors included in a parallel processing device including a first processor executing, on input data, a first program that prescribes unit processing to be executed by using data included in data sets as the input data to output a first result and a second processor executing a second program that prescribes the unit processing on the input data to output a second result to function as:

a selection unit selecting a first subset and a second subset from the data set based on a predetermined index indicating performance or function of the first processor and the second processor; and a first processor control unit inputting first data included in the first subset into the first processor; or a second processor control unit inputting second data included in the second subset into the second processor, the first program and the second program being executed in parallel by the first processor and the second processor.

As described hereinabove, while the present invention has been described with reference to the exemplary embodiments, the invention is not limited thereto. Various changes understandable to those skilled in the art can be made to the constitution and details of the invention without departing from the scope thereof.

This application claims priority based on Japanese Patent Application No. 2013-035789 filed on Feb. 26, 2013, the entire disclosure of which is incorporated herein.

INDUSTRIAL APPLICABILITY

The present invention is usable for biometric authentication security systems for entry/exit control made in combination with a door camera, an iris input device, a fingerprint input device, and/or the like, as well as personal identification systems at counters of banks and public offices, inspection at boarder points, and the like. Additionally, the invention can also be used for unattended monitoring systems in important facilities and on streets in combination with surveillance cameras.

REFERENCE SIGNS LIST

121 First data
122 Second data
123 Third data
124 Fourth data
131 First result
132 Second result
133 Final result
151 First subset
152 Second subset
153 Third subset
154 Fourth subset

What is claimed is:

1. A parallel processing device comprising:
a first processor executing, on input data, a first program that prescribes unit processing to be executed by using data included in data sets as the input data to output a first result;
a second processor executing a second program that prescribes the unit processing on the input data to output a second result;
a selection unit selecting a first subset and a second subset from the data sets based on a predetermined index indicating performance or function of the first processor and the second processor;
a first processor control unit inputting first data included in the first subset to the first processor; and
a second processor control unit inputting second data included in the second subset to the second processor, wherein:
the first program and the second program are executed in parallel by the first processor and the second processor;
the first program and the second program prescribe the unit processing to be executed by using data included in a first data set in the data sets and data included in a second data set in the data sets including at least two pieces of data as the input data;
the selection unit selects a third subset and a fourth subset from the second data set base on the index;
the first processor control unit in eats the first data included in the first data set and third data included in the third subset into the first processor;
the second processor control unit inputs the second data included in the second data set and fourth data included in the fourth subset into the second processor;
the unit processing is matching processing that preforms matching of the first data as to-be-matched data included in the first data set and the second data as registered data included in the second data set preregistered and matching of the input third data as the to-be-matched data and the fourth data as the registered data to calculate a matching score indicating a degree of matching between the to-be-matched data and the registered data; and,
further comprising an output unit outputting the registered data with which the matching score is highest as the final result.

2. The parallel processing device according to claim 1, wherein
the index indicates a number of pieces of processing executable in parallel using the first processor and the second processor.

3. The parallel processing device according to claim 1, wherein
the first processor achieves, by executing a predetermined third program,
a matching management unit managing a progress status of the matching processing,
a block cut-out unit selecting a set of the registered data unmatched as a block from the registered data set,
a result registration unit obtaining the final result from the output unit to notify the progress status to the matching management unit and obtaining the registered data with which the matching score regarding an entirety of the registered data set is highest, and
a first communication unit performing communication between the block cut-out unit, the result registration unit, and the result registration unit on a coprocessor;
the second processor achieves, by executing a predetermined fourth program,
a unit matching unit performing matching processing between a pair of pieces of data, and
a unit matching control unit executing the matching processing of each data of the block and the to-be-matched data to obtain the matching score highest in the block as the final result; and
the first processor and the second processor process in parallel matching of the registered data in the block and the to-be-matched data.

4. The parallel processing device according to claim 3, comprising:
a first unit matching unit performing the matching processing on the first processor and according to a predetermined specification;
a second unit matching unit performing the matching processing on the second processor according to the specification; and
a matching management unit located on the first processor and managing a progress status of matching processing of each data of the registered data set and the to-be-matched data,
the selection unit being located on the first processor and selecting a set of one or more pieces of unmatched data as a block from the registered data set,
the first processor control unit providing each data of the selected block and the to-be-matched data to the first processor to cause the matching processing to be performed in parallel and obtaining a highest matching score in the block as a first result,
the second processor control unit providing each data of the selected block and the to-be-matched data to the second processor to cause the matching processing to be performed in parallel and obtaining a highest matching score in the block as a second result, and the output unit obtaining the final result based on the first result and the second result.

5. The parallel processing device according to claim 1, wherein
the first program is a program using a first language for the first processor converted from a common program that prescribes the data processing procedure using a predetermined common language;
the second program is a program using a second language for the second processor converted from the common program.

6. A parallel processing method comprising:
selecting a first subset and a second subset from data sets based on a predetermined index indicating performance or function of a first processor and a second processor included in a parallel processing device;
inputting first data included in the first subset into the first processor;
inputting second data included in the second subset into the second processor;
executing, on the first data, by using the first processor, a first program that prescribes unit processing to be executed by using, as input, data included in the data sets to output a first result; and
executing a second program that prescribes the unit processing on the second data by using the second processor in parallel with the first program to output a second result; wherein:
the first program and the second program prescribe the unit processing to be executed by using data included in a first data set in the data sets and data included in a second data set in the data sets including at least two pieces of data as the input data;
selecting a third subset and a fourth subset from the second data set base on the index;
inputting the first data included in the first data set and third data set base in the third subset into the first processor;
inputting the second data included in the second data set and fourth data included in the fourth subset into the second processor; wherein:
the unit processing is matching processing that performs matching of the first data as to-be-matched data included in the first data set and the second data as registered data included in the second data set preregistered and matching of the input third data as the to-be-matched data and the fourth data as the registered data to calculate a matching score indicating a degree of matching between the to-be-matched data and the registered data; and, outputting the registered data with which the matching score is highest as the final result.

7. A non-transitory storage medium storing a parallel processing program, the parallel processing program being for causing processors included in a parallel processing device comprising a first processor executing, on input data, a first program that prescribes unit processing to be executed by using data included in data sets as the input data to output a first result and a second processor executing a second program that prescribes the unit processing on the input data to output a second result to function as:
a selection unit selecting a first subset and a second subset from the data sets based on a predetermined index indicating performance or function of the first processor and the second processor; and
a first processor control unit inputting first data included in the first subset into the first processor; or
a second processor control unit inputting second data included in the second subset into the second processor,
the first program and the second program are executed in parallel by the first processor and the second processor; wherein:
the first program and the second program prescribe the unit processing to be executed by data included in a first data set in the data sets and data included in a second data set in the data sets including at least two pieces of data as the input data;
the selection unit selects a third subset and a fourth subset from the second data set base on the index:
the first processor control unit inputs the first data included in the first data set and third data included in the third subset into the first processor;
the second processor control unit inputs the second data included in the second data set and fourth data included in the fourth subset into the second processor;
the unit processing is matching processing that performs matching of the first data as to-be-matched data included in the first data set and the second data as registered data included in the second data set preregistered and matching of the input third data as the to-be-matched data and the fourth data as the registered data to calculate a matching score indicating a degree of matching between the to-be-matched data and the registered data; and,
further functioning as an output unit outputting the registered data with which the matching score is highest as the final result.

* * * * *